US012073801B2

(12) United States Patent
Ooga

(10) Patent No.: US 12,073,801 B2
(45) Date of Patent: Aug. 27, 2024

(54) METHOD OF CONTROLLING BACKLIGHT OF DISPLAY DEVICE AND DISPLAY DEVICE FOR POWER REDUCTION USING A COMMON LUMINANCE REDUCTION RATE

(71) Applicant: Shanghai Tianma Micro-Electronics Co., Ltd., Shanghai (CN)

(72) Inventor: Kouichi Ooga, Kanagawa (JP)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 0 days.

(21) Appl. No.: 17/526,035

(22) Filed: Nov. 15, 2021

(65) Prior Publication Data

US 2022/0165224 A1 May 26, 2022

(30) Foreign Application Priority Data

Nov. 24, 2020 (JP) ................................ 2020-194648
Sep. 1, 2021 (JP) ................................ 2021-142048

(51) Int. Cl.
*G09G 3/34* (2006.01)
*G09G 3/36* (2006.01)

(52) U.S. Cl.
CPC ............ *G09G 3/3426* (2013.01); *G09G 3/36* (2013.01); *G09G 2320/066* (2013.01); *G09G 2330/021* (2013.01); *G09G 2360/16* (2013.01)

(58) Field of Classification Search
CPC ...... G09G 3/2092; G09G 3/2096; G09G 3/34; G09G 3/3406; G09G 3/342; G09G 3/3426; G09G 3/36; G09G 3/3611; G09G 3/3648; G09G 3/3666; G09G 2320/0233; G09G 2320/0238; G09G 2320/0285; G09G 2320/0626; G09G 2320/0633; G09G 2320/064; G09G 2320/0646; G09G 2320/0653; G09G 2320/066; G09G 2330/021; G09G 2360/16; G02F 1/133601
See application file for complete search history.

(56) References Cited

U.S. PATENT DOCUMENTS

2009/0184917 A1* 7/2009 Park .................... G09G 3/3426 345/102
2011/0025728 A1* 2/2011 Baba .................... G09G 3/3426 345/102
2011/0050668 A1* 3/2011 Park .................... G09G 3/3426 345/84
2011/0050743 A1* 3/2011 Park .................... G09G 3/3666 345/690
2011/0122168 A1* 5/2011 Lee .................... G09G 3/3426 345/102
2014/0002335 A1 1/2014 Oda
2014/0232760 A1 8/2014 Oda
2016/0203774 A1* 7/2016 Ahn .................... G02F 1/1336 345/102

* cited by examiner

*Primary Examiner* — Keith L Crawley
(74) *Attorney, Agent, or Firm* — Sughrue Mion, PLLC

(57) ABSTRACT

A method of controlling a backlight of a display device is disclosed. The display device includes a display panel and the backlight. The backlight includes a plurality of backlight blocks. The method determines provisional luminance values for the plurality of backlight blocks in accordance with an input video frame. The method adjusts the provisional luminance values by amounts of reduction based on a total sum of the provisional luminance values and individual provisional luminance values.

7 Claims, 23 Drawing Sheets

| | | | | | | | | | | | | | | |
|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 |
| 0 | 0 | 0 | 0 | 0 | 0.3 | 0.3 | 0.3 | 0.2 | 0 | 0 | 0 | 0.1 | 0 | 0 |
| 0 | 0 | 0 | 0 | 0 | 0 | 0.3 | 0.1 | 0 | 0.3 | 0 | 0.2 | 0 | 0.2 | 0 |
| 0 | 0 | 0 | 0 | 0 | 0 | 0.2 | 0.3 | 0 | 0 | 0 | 0 | 0 | 0 | 0 |
| 1.0 | 0 | 1.0 | 1.0 | 0 | 1.0 | 0 | 0 | 0 | 1.0 | 0 | 0.4 | 0 | 0 | 0 |
| 1.0 | 0 | 1.0 | 1.0 | 1.0 | 0 | 1.0 | 1.0 | 0 | 1.0 | 0 | 0.4 | 0.4 | 0 | 0 |
| 0 | 1.0 | 0 | 1.0 | 0 | 0 | 1.0 | 0 | 1.0 | 1.0 | 0.4 | 0.3 | 0 | 0.2 | 0 |
| 0 | 1.0 | 0 | 0 | 1.0 | 1.0 | 0 | 1.0 | 1.0 | 0 | 0 | 0 | 0 | 0 | 0 |
| 0 | 1.0 | 0 | 1.0 | 0 | 1.0 | 0 | 0 | 0 | 1.0 | 0 | 0 | 0 | 0 | 0 |
| 0 | 1.0 | 0.8 | 0 | 1.0 | 1.0 | 0 | 0.8 | 0 | 0 | 0 | 0.8 | 0.8 | 0 | 0 |
| 0 | 1.0 | 1.0 | 1.0 | 1.0 | 1.0 | 1.0 | 1.0 | 1.0 | 0 | 0.8 | 0 | 0.7 | 0 | 0 |
| 0 | 1.0 | 1.0 | 0 | 0 | 1.0 | 1.0 | 1.0 | 1.0 | 1.0 | 0 | 0 | 0.6 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0.3 | 0.3 | 0.3 | 0.2 | 0 | 0 | 0 | 0 | 0 | 0 |
| 0 | 0 | 0 | 0 | 0 | 0 | 0 | 0.1 | 0 | 0.3 | 0 | 0 | 0 | 0 | 0 |
| 0 | 0 | 0 | 0 | 0 | 0 | 0 | 0 | 0 | 0 | 0 | 0 | 0 | 0 | 0 |

| | | |
|---|---|---|
| (1,1) 0.0 | (2,1) 0.3 | (3,1) 0.2 |
| (1,2) 1.0 | (2,2) 1.0 | (3,2) 0.4 |
| (1,3) 1.0 | (2,3) 1.0 | (3,3) 0.8 |
| (1,4) 0.0 | (2,4) 0.3 | (3,4) 0.0 |

| | | |
|---|---|---|
| 0.0 | 0.0 | 0.0 |
| 0.0 | 0.0 | 0.0 |
| 0.0 | 1.0 | 0.0 |
| 0.0 | 0.0 | 0.0 |

| | | |
|---|---|---|
| 0.0 | 0.0 | 0.0 |
| 0.0 | 0.0 | 0.0 |
| 0.0 | 0.9834 | 0.0 |
| 0.0 | 0.0 | 0.0 |

PROVISIONAL LUMINANCE DISTRIBUTION IN BACKLIGHT

| | | |
|---|---|---|
| 0.0 | 0.0 | 0.0 |
| 0.0 | 0.5 | 0.0 |
| 0.5 | 1.0 | 0.5 |
| 0.0 | 0.5 | 0.0 |

ADJUSTED LUMINANCE DISTRIBUTION IN BACKLIGHT

| | | |
|---|---|---|
| 0.0 | 0.0 | 0.0 |
| 0.0 | 0.475 | 0.0 |
| 0.475 | 0.95 | 0.475 |
| 0.0 | 0.475 | 0.0 |

DISTRIBUTION OF PROVISIONAL LUMINANCE VALUES

123A

| | BACKLIGHT BLOCK GROUP 350A | BACKLIGHT BLOCK GROUP 350B | BACKLIGHT BLOCK GROUP 350C | BACKLIGHT BLOCK GROUP 350D |
|---|---|---|---|---|
| MAX | 1.0 | NIL | NIL | NIL |
| SUM | 4.0 | NIL | NIL | NIL |

LUMINANCE MANAGEMENT TABLE
(VIDEO SIGNAL PROCESSING CIRCUIT 12A)

*FIG. 15A*

123B

| | BACKLIGHT BLOCK GROUP 350A | BACKLIGHT BLOCK GROUP 350B | BACKLIGHT BLOCK GROUP 350C | BACKLIGHT BLOCK GROUP 350D |
|---|---|---|---|---|
| MAX | NIL | 1.0 | NIL | NIL |
| SUM | NIL | 12.0 | NIL | NIL |

LUMINANCE MANAGEMENT TABLE
(VIDEO SIGNAL PROCESSING CIRCUIT 12B)

*FIG. 15B*

123C

| | BACKLIGHT BLOCK GROUP 350A | BACKLIGHT BLOCK GROUP 350B | BACKLIGHT BLOCK GROUP 350C | BACKLIGHT BLOCK GROUP 350D |
|---|---|---|---|---|
| MAX | NIL | NIL | 1.0 | NIL |
| SUM | NIL | NIL | 1.0 | NIL |

LUMINANCE MANAGEMENT TABLE
(VIDEO SIGNAL PROCESSING CIRCUIT 12C)

*FIG. 15C*

123D

| | BACKLIGHT BLOCK GROUP 350A | BACKLIGHT BLOCK GROUP 350B | BACKLIGHT BLOCK GROUP 350C | BACKLIGHT BLOCK GROUP 350D |
|---|---|---|---|---|
| MAX | NIL | NIL | NIL | 1.0 |
| SUM | NIL | NIL | NIL | 3.0 |

LUMINANCE MANAGEMENT TABLE
(VIDEO SIGNAL PROCESSING CIRCUIT 12D)

*FIG. 15D*

LUMINANCE MANAGEMENT TABLE
(VIDEO SIGNAL PROCESSING CIRCUIT 12A)

123A

| | BACKLIGHT BLOCK GROUP 350A | BACKLIGHT BLOCK GROUP 350B | BACKLIGHT BLOCK GROUP 350C | BACKLIGHT BLOCK GROUP 350D |
|---|---|---|---|---|
| MAX | 1.0 | NIL | ***1.0*** | NIL |
| SUM | 4.0 | NIL | ***1.0*** | NIL |

123C

| | BACKLIGHT BLOCK GROUP 350A | BACKLIGHT BLOCK GROUP 350B | BACKLIGHT BLOCK GROUP 350C | BACKLIGHT BLOCK GROUP 350D |
|---|---|---|---|---|
| MAX | ***1.0*** | NIL | 1.0 | NIL |
| SUM | ***4.0*** | NIL | 1.0 | NIL |

LUMINANCE MANAGEMENT TABLE
(VIDEO SIGNAL PROCESSING CIRCUIT 12C)

*FIG. 16A*

LUMINANCE MANAGEMENT TABLE
(VIDEO SIGNAL PROCESSING CIRCUIT 12B)

123B

| | BACKLIGHT BLOCK GROUP 350A | BACKLIGHT BLOCK GROUP 350B | BACKLIGHT BLOCK GROUP 350C | BACKLIGHT BLOCK GROUP 350D |
|---|---|---|---|---|
| MAX | NIL | 1.0 | NIL | ***1.0*** |
| SUM | NIL | 12.0 | NIL | ***3.0*** |

123D

| | BACKLIGHT BLOCK GROUP 350A | BACKLIGHT BLOCK GROUP 350B | BACKLIGHT BLOCK GROUP 350C | BACKLIGHT BLOCK GROUP 350D |
|---|---|---|---|---|
| MAX | NIL | ***1.0*** | NIL | 1.0 |
| SUM | NIL | ***12.0*** | NIL | 3.0 |

LUMINANCE MANAGEMENT TABLE
(VIDEO SIGNAL PROCESSING CIRCUIT 12D)

*FIG. 16B*

LUMINANCE MANAGEMENT TABLE
(VIDEO SIGNAL PROCESSING CIRCUIT 12A)

123A

| | BACKLIGHT BLOCK GROUP 350A | BACKLIGHT BLOCK GROUP 350B | BACKLIGHT BLOCK GROUP 350C | BACKLIGHT BLOCK GROUP 350D |
|---|---|---|---|---|
| MAX | 1.0 | ***1.0*** | 1.0 | ***1.0*** |
| SUM | 4.0 | ***12.0*** | 1.0 | ***3.0*** |

123B

| | BACKLIGHT BLOCK GROUP 350A | BACKLIGHT BLOCK GROUP 350B | BACKLIGHT BLOCK GROUP 350C | BACKLIGHT BLOCK GROUP 350D |
|---|---|---|---|---|
| MAX | ***1.0*** | 1.0 | ***1.0*** | 1.0 |
| SUM | ***4.0*** | 12.0 | ***1.0*** | 3.0 |

LUMINANCE MANAGEMENT TABLE
(VIDEO SIGNAL PROCESSING CIRCUIT 12B)

*FIG. 16C*

LUMINANCE MANAGEMENT TABLE
(VIDEO SIGNAL PROCESSING CIRCUIT 12C)

123C

| | BACKLIGHT BLOCK GROUP 350A | BACKLIGHT BLOCK GROUP 350B | BACKLIGHT BLOCK GROUP 350C | BACKLIGHT BLOCK GROUP 350D |
|---|---|---|---|---|
| MAX | 1.0 | ***1.0*** | 1.0 | ***1.0*** |
| SUM | 4.0 | ***12.0*** | 1.0 | ***3.0*** |

123D

| | BACKLIGHT BLOCK GROUP 350A | BACKLIGHT BLOCK GROUP 350B | BACKLIGHT BLOCK GROUP 350C | BACKLIGHT BLOCK GROUP 350D |
|---|---|---|---|---|
| MAX | ***1.0*** | 1.0 | ***1.0*** | 1.0 |
| SUM | ***4.0*** | 12.0 | ***1.0*** | 3.0 |

LUMINANCE MANAGEMENT TABLE
(VIDEO SIGNAL PROCESSING CIRCUIT 12D)

*FIG. 16D*

DISTRIBUTION OF PROVISIONAL LUMINANCE VALUES

| | BACKLIGHT BLOCK GROUP 370A | BACKLIGHT BLOCK GROUP 370B |
|---|---|---|
| MAX | 1.0 | NIL |
| SUM | 4.0 | NIL |

127A

LUMINANCE MANAGEMENT TABLE
(VIDEO SIGNAL PROCESSING CIRCUIT 120A)

FIG. 19A

| | BACKLIGHT BLOCK GROUP 370A | BACKLIGHT BLOCK GROUP 370B |
|---|---|---|
| MAX | NIL | 1.0 |
| SUM | NIL | 12.0 |

127B

LUMINANCE MANAGEMENT TABLE
(VIDEO SIGNAL PROCESSING CIRCUIT 120B)

FIG. 19B

LUMINANCE MANAGEMENT TABLE
(VIDEO SIGNAL PROCESSING CIRCUIT 120A)

127A

| | BACKLIGHT BLOCK GROUP 370A | BACKLIGHT BLOCK GROUP 370B |
|---|---|---|
| MAX | 1.0 | 1.0 |
| SUM | 4.0 | 12.0 |

127B

| | BACKLIGHT BLOCK GROUP 370A | BACKLIGHT BLOCK GROUP 370B |
|---|---|---|
| MAX | 1.0 | 1.0 |
| SUM | 4.0 | 12.0 |

LUMINANCE MANAGEMENT TABLE
(VIDEO SIGNAL PROCESSING CIRCUIT 120B)

DISTRIBUTION OF ADJUSTED LUMINANCE VALUES

METHOD OF CONTROLLING BACKLIGHT OF DISPLAY DEVICE AND DISPLAY DEVICE FOR POWER REDUCTION USING A COMMON LUMINANCE REDUCTION RATE

CROSS-REFERENCE TO RELATED APPLICATIONS

This non-provisional application claims priority under 35 U.S.C. § 119(a) on Patent Application No. 2020-194648 filed in Japan on Nov. 24, 2020 and Patent Application No. 2021-142048 filed in Japan on Sep. 1, 2021, the entire contents of which are hereby incorporated by reference.

BACKGROUND

This disclosure relates to control of the backlight of a display device.

A technology called local dimming is used. Local dimming divides the light emitting plane of the backlight of a liquid crystal display device into a plurality of blocks and controls whether to decrease the amount of light emission of each block individually depending on the brightness in the video frame.

For example, in displaying a white window in a full black background, the local dimming controls the backlight so that the region (blocks) opposite to the region to display the white window will emit more light (at higher luminance) and the region (blocks) opposite to the region (blocks) to display the background (in black) will emit less light.

Such control achieves reduction in the power for the backlight, compared to the case where the whole region of the backlight lights at 100% all the time. Furthermore, the increased difference in luminance between the region emitting more light and the region emitting less light provides a higher contrast ratio in the same plane, which improves the display quality. Examples of the technology of local dimming are disclosed in US 2014/0002335 A and US 2014/0232760 A, for example.

SUMMARY

An aspect of this disclosure is a method of controlling a backlight of a display device including a display panel and the backlight. The backlight includes a plurality of backlight blocks. The method includes: determining provisional luminance values for the plurality of backlight blocks in accordance with an input video frame; and adjusting the provisional luminance values by amounts of reduction based on a total sum of the provisional luminance values and individual provisional luminance values.

Another aspect of this disclosure is a display device including: a display panel; a backlight disposed behind the display panel, the backlight including a plurality of backlight blocks; and a controller configured to control luminance values of the plurality of backlight blocks and transmission of light from the backlight through the display panel. The controller is configured to: determine provisional luminance values for the plurality of backlight blocks in accordance with an input video frame; and adjust the provisional luminance values by amounts of reduction based on a total sum of the provisional luminance values and the individual provisional luminance values.

It is to be understood that both the foregoing general description and the following detailed description are exemplary and explanatory and are not restrictive of this disclosure.

BRIEF DESCRIPTION OF THE DRAWINGS

FIG. 15A provides a configuration example of a luminance management table held in a video signal processing circuit;

FIG. 15B provides a configuration example of a luminance management table held in another video signal processing circuit;

FIG. 15C provides a configuration example of a luminance management table held in still another video signal processing circuit;

FIG. 15D provides a configuration example of a luminance management table held in still another video signal processing circuit;

FIG. 16A illustrates luminance management tables updated with a result of communication between video signal processing circuits;

FIG. 16B illustrates other luminance management tables updated with a result of communication between video signal processing circuits;

FIG. 16C illustrates luminance management tables updated with a result of communication between video signal processing circuits;

FIG. 16D illustrates other luminance management tables updated with a result of communication between video signal processing circuits;

FIG. 19A provides a configuration example of a luminance management table held in a video signal processing circuit;

FIG. 19B provides a configuration example of a luminance management table held in another video signal processing circuit;

EMBODIMENTS

Figure 1:
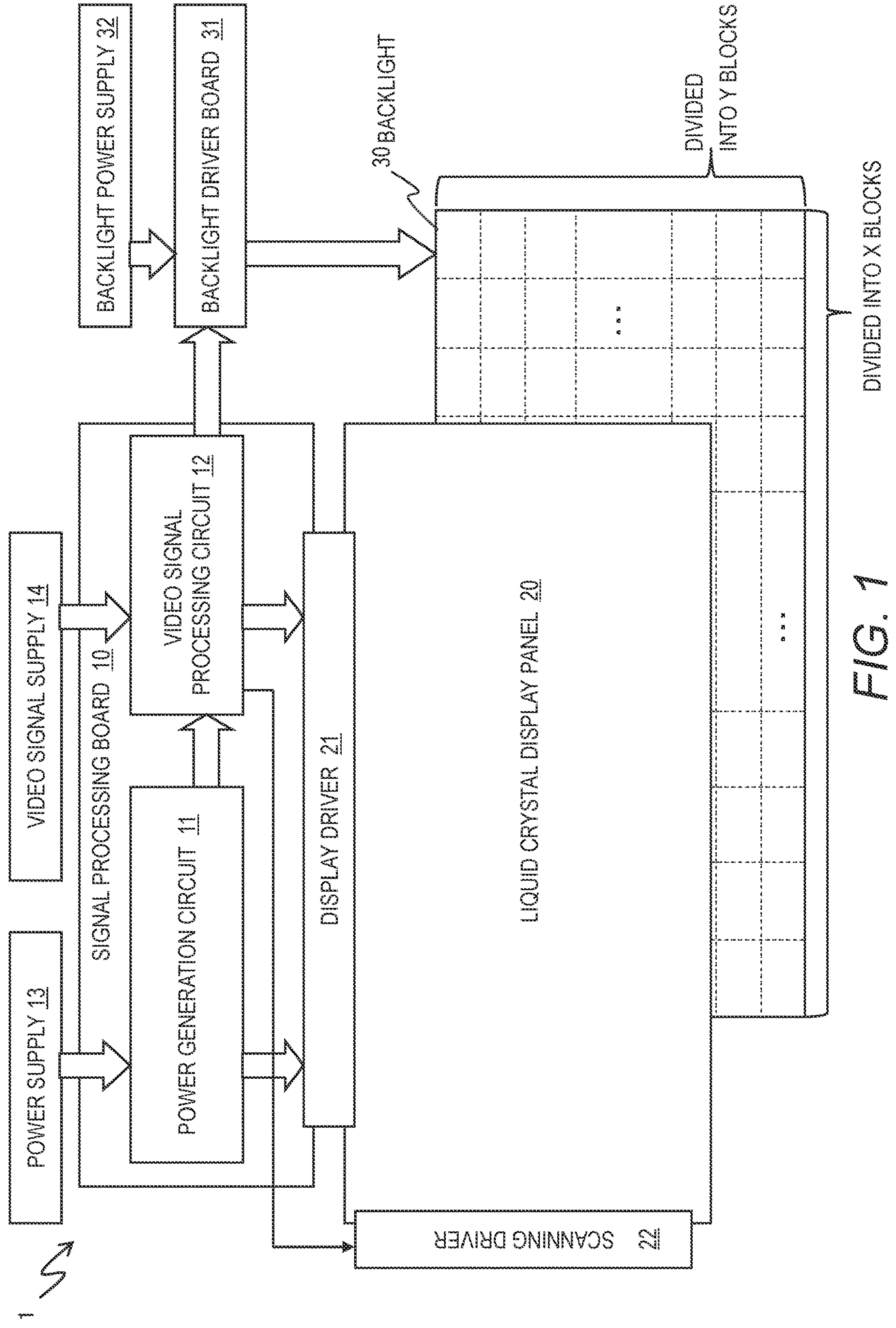
FIG. 1 illustrates a configuration example of a display device in an embodiment.

Hereinafter, embodiments of this disclosure will be described with reference to the accompanying drawings. It should be noted that the embodiments are merely examples to implement this disclosure and are not to limit the technical scope of this disclosure. Elements common to the drawings are denoted by the same reference signs and some elements in the drawings are exaggerated in size or shape for clear understanding of the description.

A display device in an embodiment to be disclosed hereinafter includes a display panel and a backlight including a plurality of backlight blocks. The display device determines provisional luminance values for the individual backlight blocks based on an input video frame. Further, the display device determines the amounts of reduction for the individual provisional luminance values based on the total sum of the provisional luminance values and the individual provisional luminance values and adjusts the luminance values. This configuration in an embodiment reduces the power consumption of the backlight while reducing the oddness of the images to be felt by the viewer. Hereinafter, the embodiments will be described more specifically.

Embodiment 1

FIG. 1 illustrates a configuration example of a display device in an embodiment. The display device displays an image by controlling transmission of light from the backlight. FIG. 1 illustrates a configuration example of a liquid crystal display device 1 as an example of a display device. The liquid crystal display device 1 includes a signal processing board 10, a power supply 13, a video signal supply 14, a liquid crystal display panel 20, a display driver 21, and a scanning driver 22. The liquid crystal display device 1 further includes a backlight 30, a backlight driver board 31, and a backlight power supply 32. The signal processing board 10 includes a power generation circuit 11 and a video signal processing circuit 12. The signal processing board 10, the display driver 21, and the scanning driver 22 can be included in the controller for controlling the liquid crystal display panel 20.

The liquid crystal display panel 20 is disposed in front (on the side to be viewed by the user) of the backlight 30 and controls the amount of the light from the backlight 30 to be transmitted therethrough to display video frames (images) successively input from the external. The power generation circuit 11 can include a DC-DC converter; it generates and supplies electric power for the other circuits to operate. The video signal processing circuit 12 performs processing involved in displaying images, such as generating a signal for displaying an image on the liquid crystal display panel 20 and a signal for controlling the backlight 30. The power supply 13 supplies electric power to the power generation circuit 11. The video signal supply 14 supplies a video signal to the video signal processing circuit 12.

The power generation circuit 11 generates electric power to drive ICs such as the video signal processing circuit 12, the display driver 21, and the scanning driver 22. The display driver 21 and the scanning driver 22 are configured to operate using the power supplied from the power generation circuit 11 to perform their processing.

The display driver 21 generates a data signal from the video signal sent from the video signal processing circuit 12 and supplies the data signal to the liquid crystal display panel 20. The scanning driver 22 selects scanning lines of the liquid crystal display panel 20 one by one in accordance with a timing signal sent from the video signal processing circuit 12. The video signal processing circuit 12 also sends the timing signal to the display driver 21. In accordance with the timing signal, the display driver 21 generates a data signal from the received video signal and supplies the data signal to the liquid crystal display panel 20.

The video signal processing circuit 12 converts the data arrangement of the video signal input from the external to send it to the display driver 21 and generates and sends a timing signal for the drivers 21 and 22 to operate using the power supplied from the power generation circuit 11. The video signal processing circuit 12 further generates a driving control signal for controlling the driving of a plurality of backlight blocks included in the backlight 30 and sends the driving control signal to the backlight driver board 31. Examples of the driving control signal include a backlight ON/OFF control signal and a dimming control signal. The dimming control signal is a pulse width modulation (PWM) signal for controlling the lighting periods of light sources by time sharing or a signal for controlling the amounts of electric current flowing in the light sources.

The backlight 30 is a planar light source device disposed behind the liquid crystal display panel 20 to emit light required for the liquid crystal display panel 20 to display an image. The backlight driver board 31 includes a backlight driver circuit and controls the lighting (luminance) of the backlight 30 in accordance with the driving control signal sent from the video signal processing circuit 12. The backlight driver board 31 operates using the power supplied from the backlight power supply 32.

The liquid crystal display device 1 employs local dimming and divides the backlight 30 into X blocks (regions) along the X-axis and Y blocks along the Y-axis, as illustrated in FIG. 1. The liquid crystal display device 1 can individually control the luminance values (the amounts of light emission) of the (X×Y) blocks. The liquid crystal display device 1 controls whether to decrease the amount of light emission of each block individually depending on the brightness level in the video frame to reduce the power consumption and improve the contrast ratio.

The backlight 30 can be a direct backlight, which includes a light source array disposed within the backlight plane to be opposite to the liquid crystal display panel 20 and a diffuser panel between the light source array and the liquid crystal display panel 20. A typical example of the light source is an LED. A plurality of LEDs can be disposed in a backlight block. A desirable number of LEDs can be included in one backlight block. An optimum number of LEDs are disposed at optimum locations based on the luminance efficiency and luminance distribution of the LEDs.

Instead of the above-described direct type, the backlight 30 can be of an edge type, which includes a light guide panel and light sources disposed on both sides. The backlight 30 can be composed of backlight blocks disposed in a matrix or backlight blocks disposed in a horizontal or a vertical line.

The video signal processing circuit 12 generates a driving control signal for controlling the luminance of individual blocks of the backlight 30 and sends the driving control signal to the backlight driver board 31. The backlight driver board 31 drives and controls the light sources (for example, LEDs) of the backlight 30 so that the individual blocks light at the luminance values (the amounts of light emission) specified in the driving control signal from the video signal processing circuit 12.

The video signal processing circuit 12 generates a timing signal for the display driver 21 and the scanning driver 22 in accordance with the input timing signal for the video signal and also, successively sends a signal (frame signal) of each video frame in the video signal to the display driver 21. The frame signal can specify the intensity levels of red (R), green (G), and blue (B) of each pixel in a video frame.

The video signal processing circuit 12 further analyzes the video frame, generates driving control signal for the backlight 30 to illuminate the liquid crystal display panel 20 from its behind based on the analysis result, and sends the driving control signal to the backlight 30. As described above, the liquid crystal display device 1 employs local dimming. The video signal processing circuit 12 determines provisional luminance values for individual blocks of the backlight 30 based on the analysis result on the video frame.

The video signal processing circuit 12 further determines the amounts of reduction for the individual provisional luminance values based on the provisional luminance values for the blocks. The video signal processing circuits 12 adjusts the provisional luminance values by the amounts of reduction and determines the adjusted values to be luminance values for the individual blocks. The adjustment by lowering the provisional luminance values determined based on a video frame reduces the power consumption of the backlight 30. Adjusting the provisional luminance values determined in accordance with a video frame based on the provisional luminance values reduces the oddness to be felt by the viewer because of the lowered luminance.

Figure 2:
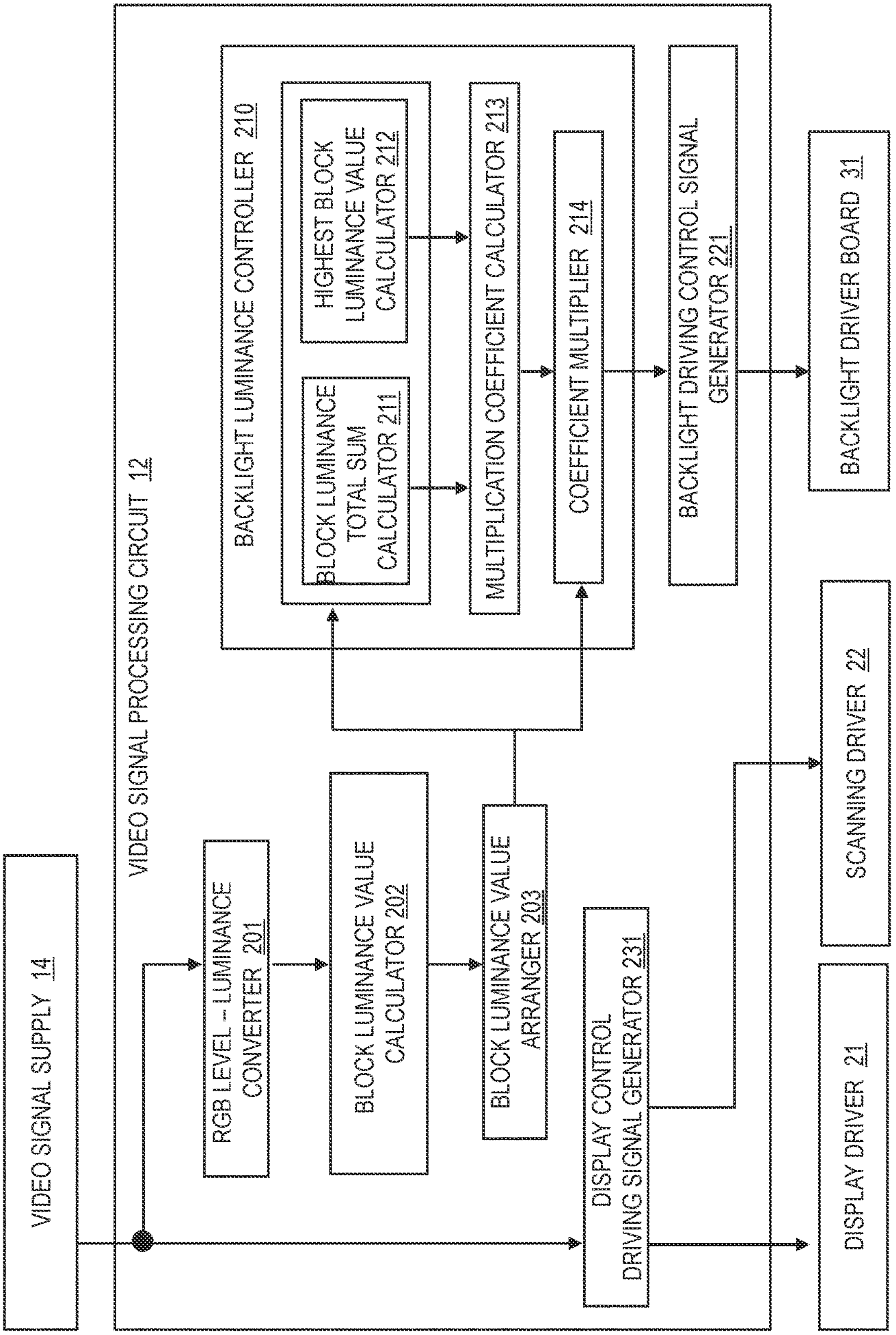
FIG. 2 schematically illustrates an example of the functional configuration of a video signal processing circuit.

Hereinafter, control of the backlight 30 by the video signal processing circuit 12 is described in detail. FIG. 2 schematically illustrates an example of the functional configuration of the video signal processing circuit 12. The video signal processing circuit 12 includes a display control driving signal generator 231, an RGB level—luminance converter 201, a block luminance value calculator 202, a block luminance value arranger 203, a backlight luminance controller 210, and a backlight driving control signal generator 221. The backlight luminance controller 210 includes a block luminance total sum calculator 211, a highest block luminance value calculator 212, a multiplication coefficient calculator 213, and a coefficient multiplier 214.

The display control driving signal generator 231 generates signals to be sent to the display driver 21 and the scanning driver 22 from a video signal received from the video signal supply 14. The display control driving signal generator 231 sends the display driver 21 a signal specifying the RGB intensity levels of each pixel in a video frame together with a timing signal and sends the scanning driver 22 the timing signal.

The RGB level—luminance converter 201, the block luminance value calculator 202, and the block luminance value arranger 203 are circuits for determining the provisional luminance values (the provisional amounts of light emission) for individual blocks of the backlight 30 based on a video frame. Specifically, the RGB level—luminance converter 201 converts the RGB intensity levels of each pixel specified by the video frame into relative luminance values. The luminance value of a pixel to be used to determine the luminance for the backlight is the highest luminance value among the values of red, blue, and green components (also referred to as subpixels) constituting the pixel.

The block luminance value calculator 202 determines provisional luminance values for individual blocks of the backlight 30 based on the luminance values of the pixels of the video frame. The block luminance value calculator 202 determines a luminance value determined from the highest luminance value among the luminance values of the pixels in a part (also referred to as display region block) of the display region opposite to a block to be the luminance value for the block. To distinguish the block of the backlight 30 from the display region block, the block of the backlight 30 can be referred to as backlight block. Each backlight block is associated with the display region block opposite to the backlight block.

In the following description, the luminance values of the pixels and the luminance values of the backlight blocks are relative luminance values ranging from 0 to 1. The block luminance value calculator 202 determines the highest value among the luminance values of the pixels in the opposite display region block to be the provisional luminance value for the backlight block.

The block luminance value arranger 203 generates an array (distribution) of the provisional luminance values for the backlight blocks calculated by the block luminance value calculator 202. In the array, the provisional luminance values are associated with the blocks of the backlight 30. The block luminance value arranger 203 sends the generated array of provisional luminance values to the backlight luminance controller 210.

The backlight luminance controller 210 adjusts the received provisional luminance values to determine the luminance values for the blocks. The backlight luminance controller 210 determines the amounts to be reduced from the provisional luminance values for the blocks based on the distribution of provisional luminance values. The details of the adjustment method will be described later.

The backlight driving control signal generator 221 acquires the luminance values determined for the individual blocks from the backlight luminance controller 210 and generates driving control signals in accordance with the luminance values. The backlight driving control signal generator 221 generates driving control signals for the specified luminance values to meet the physical characteristics of the light sources included in individual blocks, for example. The backlight driving control signal generator 221 sends the driving control signals for the individual blocks to the backlight driver board 31.

Hereinafter, an example of the method for the backlight luminance controller 210 to adjust the luminance values for individual blocks of the backlight 30 is described. The backlight luminance controller 210 determines the amounts to be reduced from the provisional luminance values determined in accordance with a video frame based on the provisional luminance values. The backlight luminance controller 210 adjusts the provisional luminance values by the amounts to be reduced. As a result, the power consumption of the backlight 30 is reduced while suppressing the oddness to be felt by the viewer.

Figure 3:
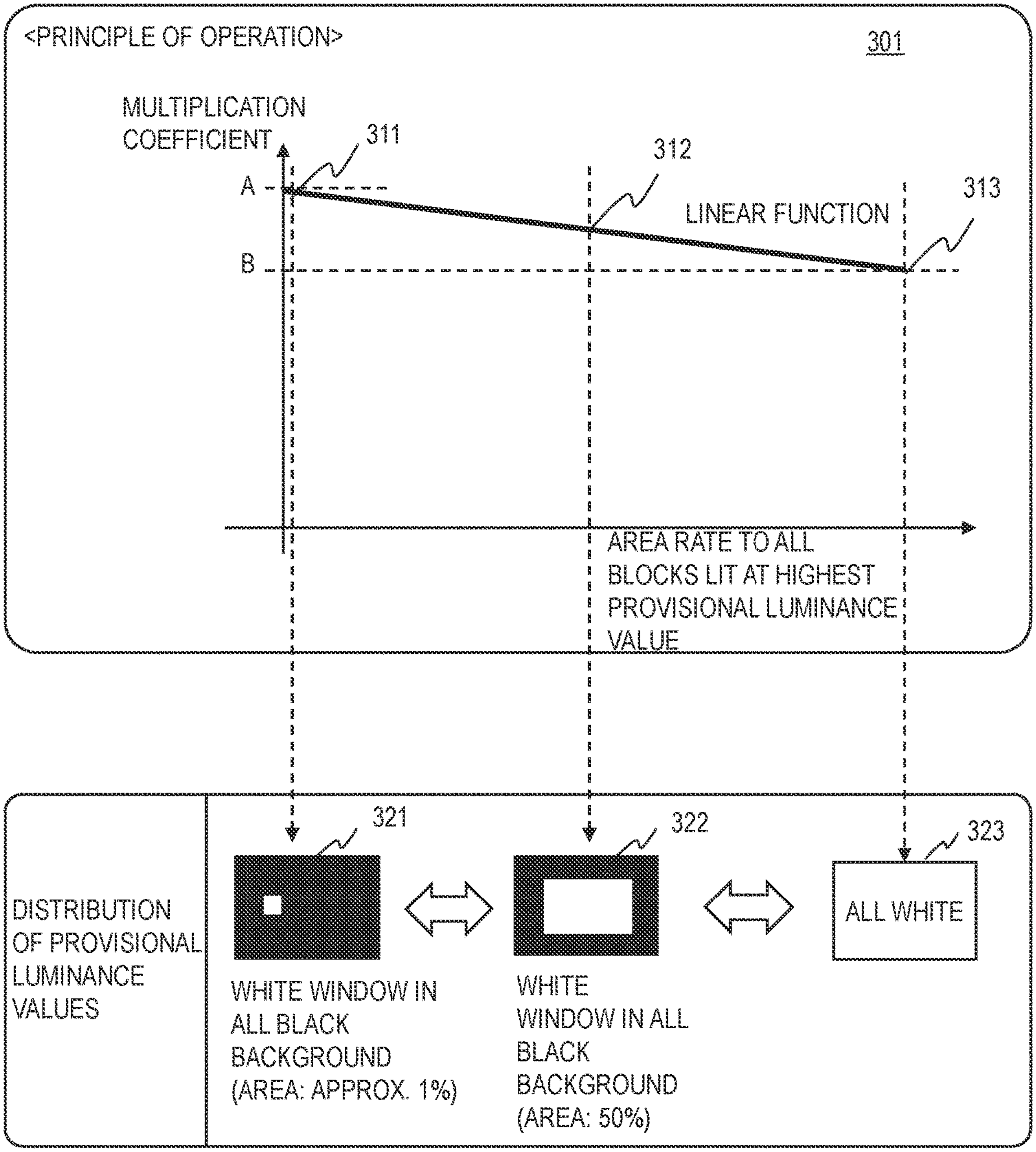
FIG. 3 is a diagram for illustrating the outline of a method for a backlight luminance controller to adjust provisional luminance values.

FIG. 3 is a diagram for illustrating the outline of the method for the backlight luminance controller 210 to adjust the provisional luminance values. This example calculates a multiplication coefficient not larger than 1 by a predetermined method and determines luminance values for individual blocks based on the products of the multiplication coefficient and the provisional luminance values. In an example, the multiplication coefficient is determined based on the total sum of the provisional luminance values and the highest value among the provisional luminance values.

The graph 301 in FIG. 3 represents an example of the function defining the multiplication coefficient. Assume that the input to this function is an area rate of the calculated provisional luminance values to the state where all blocks are lit at the highest provisional luminance value. This value is a value of the ratio of the total sum of the provisional luminance values to the product of the highest value among the provisional luminance values and the number of blocks. That is to say, this value is obtained by dividing the total sum of the provisional luminance values by the product of the highest value among the provisional luminance values and the number of blocks. The value obtained by deducting the multiplication coefficient from 1 is the reduction rate for the provisional luminance values.

As noted from FIG. 3, the multiplication coefficient becomes smaller or the reduction rate for the provisional luminance values increases as the area rate increases. In the example of FIG. 3, the maximum value for the multiplication coefficient is a value A and the minimum value for the multiplication coefficient is a value B. The maximum value A and the minimum value B are preset to the backlight luminance controller 210. The multiplication coefficient in the example of FIG. 3 is a linear function and in a narrow definition, a monotonously decreasing function.

For example, in the case where an input video frame is all white (all pixels are at the maximum luminance value), the corresponding provisional luminance value distribution 323 of the backlight 30 shows the luminance value of 1.0 (the maximum value in the normalized luminance values) for all blocks. The area rate of the provisional luminance values in this distribution is 1, which corresponds to the point 313 in the graph 301. Accordingly, the multiplication coefficient is determined to be the value B at the point 313.

Another example 322 of provisional luminance value distribution shows a white window having an area rate of approximately 50% in a black background. The provisional luminance values for the blocks for the white window are 1.0 and the provisional luminance values for the other blocks are 0.0. The area rate for determining the multiplication coefficient is the area rate of the blocks at the provisional luminance value of 1.0 to the whole area. In the graph 301, this area rate corresponds to the point 312. Accordingly, the multiplication coefficient is determined to be the value at the point 312, which is larger than the minimum value B and smaller than the maximum value A.

Still another example 321 of provisional luminance value distribution shows a white window having an area rate of approximately 1% in a black background. The provisional luminance value for the block for the white window is 1.0 and the provisional luminance values for the other blocks are 0.0. The area rate for determining the multiplication coefficient is the area rate of the block at the provisional luminance value of 1.0 to the whole area. In the graph 301, this area rate corresponds to the point 311. Accordingly, the multiplication coefficient is determined to be the value at the point 311, which is close to the maximum value A.

According to the conventional typical local dimming driving, when a video frame is all black (all pixels are at the minimum luminance value), all blocks of the backlight 30 are turned off. This means that the provisional luminance values for all blocks are 0.0. The luminance values after being multiplied by a coefficient of 1.0 are 0.0, which is the same as the state where all blocks are off. Therefore, you will understand that the intended driving is attained with this function. Moreover, FIG. 3 indicates that the multiplication coefficient gets closer and closer to the value A=1.0 as the white window becomes smaller and smaller.

The multiplication coefficient in the above-described example is expressed by a monotonously decreasing linear function according to a narrow definition. The multiplication coefficient can be expressed by a non-linear function or a decreasing function in a broader definition. In the example described herein, the multiplication coefficient, or the reduction rate for the luminance, is common to all blocks; however, the blocks can be assigned different reduction rates.

Hereinafter, a method of calculating the multiplication coefficient in the graph 301 in FIG. 3 is described specifically. The highest value among the provisional luminance values for all blocks of the backlight 30 is expressed as MAX. The total sum of the provisional luminance values for all blocks of the backlight 30 is expressed as SUM. The number of blocks included in the backlight 30 is expressed as BL_number.

The maximum value and the minimum value for the multiplication coefficient are expressed as value A and value B, respectively. The area rate of the current provisional luminance value distribution to all blocks lighting at the highest provisional luminance value is expressed as Sq. The area rate Sq can be expressed by the following formula:

$$Sq=\text{SUM}/(\text{MAX}*\text{BL\_number}).$$

Furthermore, the relation between the area rate Sq and the multiplication coefficient mult_coef can be expressed by the following formula:

$$\text{mult\_coef}=Sq*B+(1.0-Sq)*A.$$

The luminance values for individual blocks are determined by multiplying the provisional luminance values for the blocks by the multiplication coefficient mult_coef. In the configuration example of FIG. 2, the block luminance total sum calculator 211 calculates the total sum SUM of the provisional luminance values for all blocks. The highest block luminance value calculator 212 selects the highest value MAX from the provisional luminance values for all blocks.

The multiplication coefficient calculator 213 acquires the total sum SUM of the provisional luminance values from the block luminance total sum calculator 211 and the highest value MAX among the provisional luminance values from the highest block luminance value calculator 212. The multiplication coefficient calculator 213 calculates the area rate Sq from these two values in accordance with the foregoing formula and further, calculates the multiplication coefficient mult_coef from the area rate Sq and the parameters A and B. The coefficient multiplier 214 multiplies the provisional luminance values for individual blocks by the multiplication coefficient mult_coef to determine the luminance values for individual blocks.

The maximum value A and the minimum value B for the multiplication coefficient are assigned in advance appropriate values so that the viewer will feel the oddness caused by the lowered luminance as little as possible. The inventors' research revealed that the viewer is more likely to feel the oddness when the minimum value B is smaller than 0.7 or the maximum reduction rate is higher than 0.3 (30%). For example, the maximum value A is determined to be 1.0 and the minimum value B is determined to be a value not smaller than 0.7. From the standpoint of saving power consumption, the minimum value B is to be smaller than 1.

The above example uses a total sum of luminance values (MAX*BL_number) when all blocks are lit at the highest provisional luminance value as a reference value for calculating the multiplication coefficient. This configuration produces large power saving effect depending on the provisional luminance values, while suppressing the oddness of the image caused by lowering the luminance. In another example, the reference value can be a constant, such as a number of blocks in the backlight.

Hereinafter, specific examples of calculating a multiplication coefficient in accordance with the above-described method and decreasing provisional luminance values of individual blocks of the backlight 30 are described. In the following examples, the parameter values of the maximum value A and the minimum value B for the multiplication coefficient are 1.0 and 0.8, respectively.

Figure 4A:
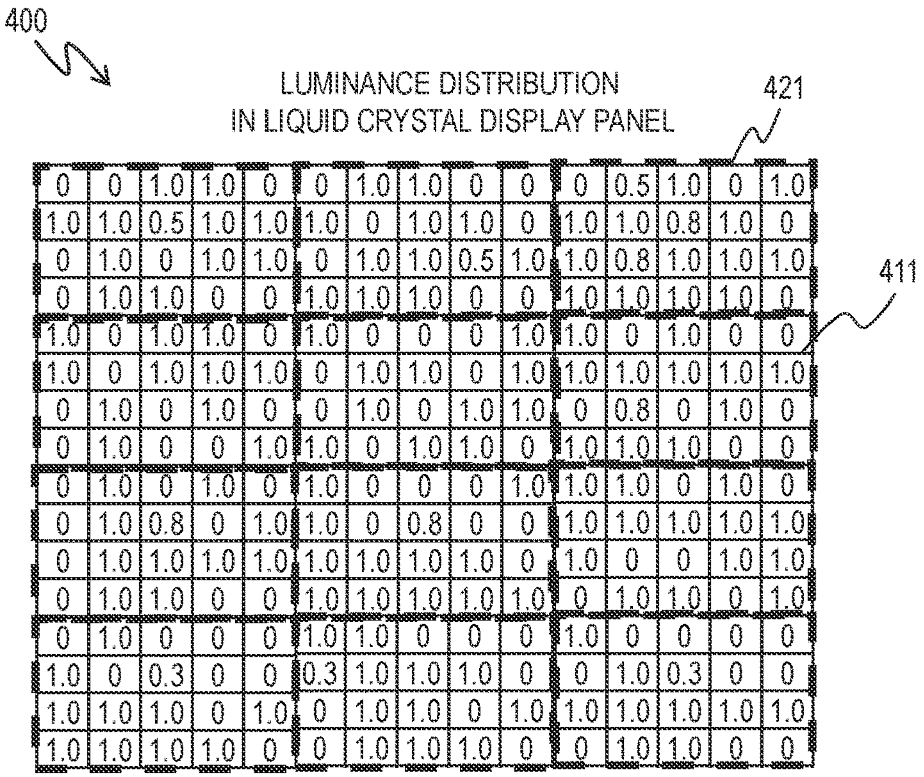
FIG. 4A illustrates an example of pixel luminance distribution in the display region of a liquid crystal display panel in accordance with an input video frame.

FIG. 4A illustrates an example of pixel luminance distribution in the display region 400 of a liquid crystal display panel 20 in accordance with an input video frame. The display region 400 consists of 15×16 pixels 411. In FIG. 4A, one of the pixels is provided with a reference sign 411 by way of example. The pixels 411 are disposed in a matrix. The numbers within the rectangles representing the pixels 411 are relative luminance values for the pixels.

In the case where a pixel consists of subpixels of different colors, the luminance of the pixel is the highest luminance among the subpixels, as described above. Although the pixels 411 in FIG. 4A are represented by rectangles, the shape of the pixels is not limited to a rectangle and the layout of the pixels is also determined desirably.

The display region 400 consists of a plurality of display region blocks 421. Each display region block 421 is opposite to a block of the backlight 30 and they are associated with each other. In FIG. 4A, the display region blocks 421 are surrounded by dashed lines and one of them is provided with a reference sign 421 by way of example.

The display region 400 in the example of FIG. 4A consists of 12 display region blocks 421 disposed in a 3×4 matrix. One display region block 421 in the configuration example of FIG. 4A consists of 5×4, 20 in total, of pixels. In this example, all display region blocks 421 have the same shape and the same number of pixels, but they can have different shapes and different numbers of pixels.

Figure 4B:
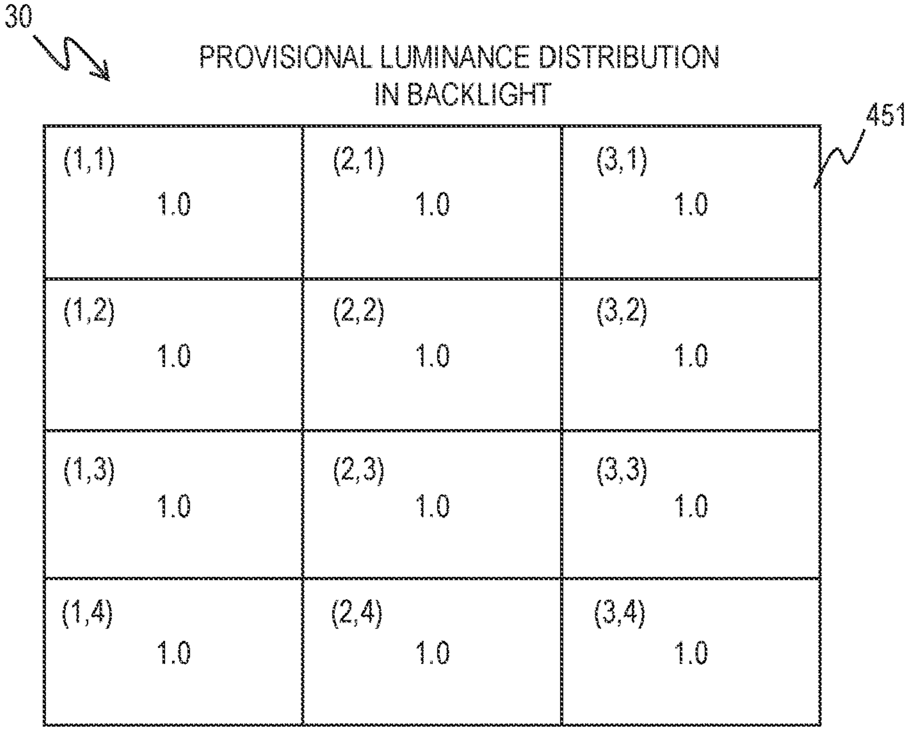
FIG. 4B illustrates a provisional luminance distribution in the backlight corresponding to the display region luminance distribution in the display region in FIG. 4A.

FIG. 4B illustrates a provisional luminance distribution in the backlight 30 corresponding to the display region luminance distribution in the display region 400 in FIG. 4A. The backlight 30 consists of 12 backlight blocks 451 in a 3×4 matrix. In FIG. 4B, one of the backlight blocks is provided with a reference sign 451 by way of example.

The combination of numerals (x, y) within each backlight block 451 represents the coordinates (column, row) of the backlight block 451 in the backlight 30. The number at the center of each backlight block 451 represents the provisional luminance value for the backlight block 451. Each backlight block 451 is opposed to a display region block 421 at the same location in the display region 400.

The provisional luminance value for a backlight block 451 is determined based on the luminance values of the pixels in the display region block 421 opposite thereto. In this example, all backlight blocks 451 are assigned a provisional luminance value of 1.0.

Figure 5:
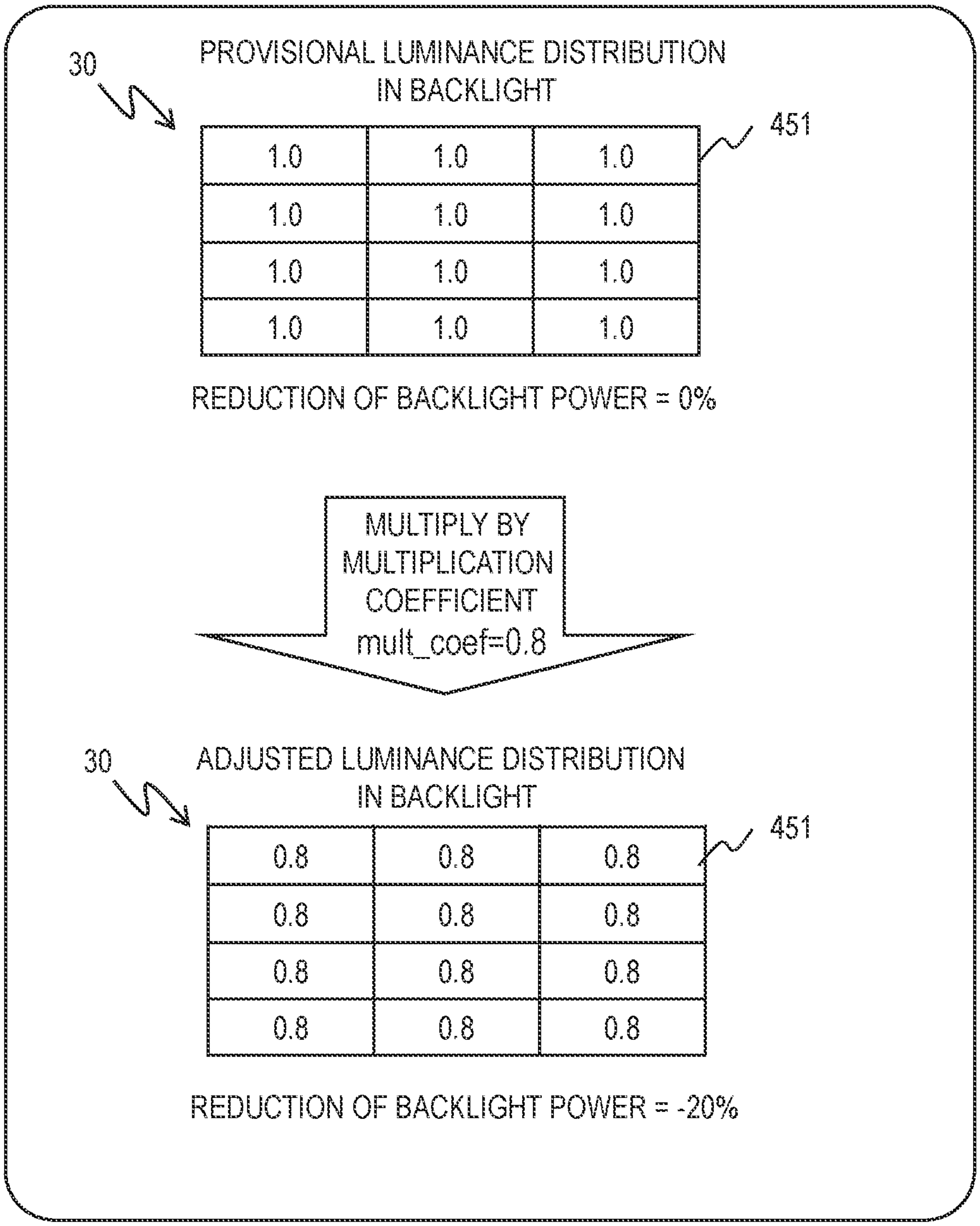
FIG. 5 illustrates an example of adjusting the provisional luminance distribution in the backlight in FIG. 4B.

FIG. 5 illustrates an example of adjusting the provisional luminance distribution in the backlight 30 provided in FIG. 4B. According to the provisional luminance distribution in the backlight 30, all backlight blocks 451 are assigned a provisional luminance value of 1.0. Accordingly, the power saving effect of the local dimming based on the video frame is 0%.

The backlight luminance controller 210 calculates a multiplication coefficient mult_coef as described above. The multiplication coefficient mult_coef is determined so that the adjustment produces large power saving effect for an image with which the power saving effect of the local dimming to determine provisional luminance values is small (an image with a large total sum of provisional luminance values).

The area rate Sq of this example is calculated as follows:

$$Sq = \text{SUM}/(\text{MAX} * \text{BL\_number}) = 12/(1 * 12) = 1.0.$$

Further, the multiplication coefficient mult_coef is calculated as follows:

$$\text{mult\_coef} = Sq * B + (1.0 - Sq) * A = 1.0 * 0.8 + (1.0 - 1.0) * 1.0 = 0.8.$$

As noted from the above, the value of the multiplication coefficient mult_coef in this example is 0.8, which is the predetermined minimum value.

The backlight luminance controller 210 calculates products of the provisional luminance values and the calculated multiplication coefficient mult_coef as adjusted luminance values for the individual backlight blocks 451. The luminance values for all backlight blocks 451 are 0.8. Accordingly, the power saving effect after the adjustment is −20%.

The power saving effect by local dimming based on the image frame in this example is 0%, which is the minimum value. For this reason, the multiplication coefficient mult_coef is determined to be the minimum value of 0.8 so that large power saving effect is attained by the adjustment. That is to say, the reduction rate is determined to be the maximum value of 0.2. This example of calculation illustrated in FIGS. 4A, 4B and 5 corresponds to the state 323 where the display region 400 displays all white and the point 313 in FIG. 3.

Figure 6A:
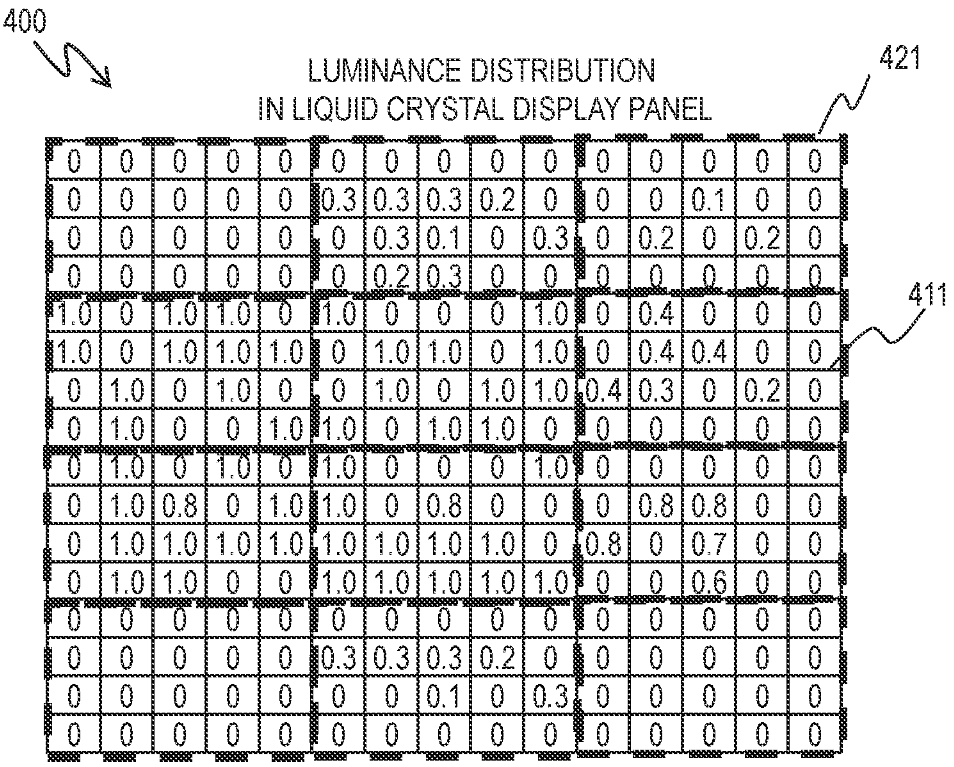
FIG. 6A illustrates another example of pixel luminance distribution in the display region of a liquid crystal display panel in accordance with an input video frame.

FIG. 6A illustrates another example of pixel luminance distribution in the display region 400 of a liquid crystal display panel 20 in accordance with an input video frame. The luminance values of some of the pixels are lower than 1.0, including 0.

Figure 6B:
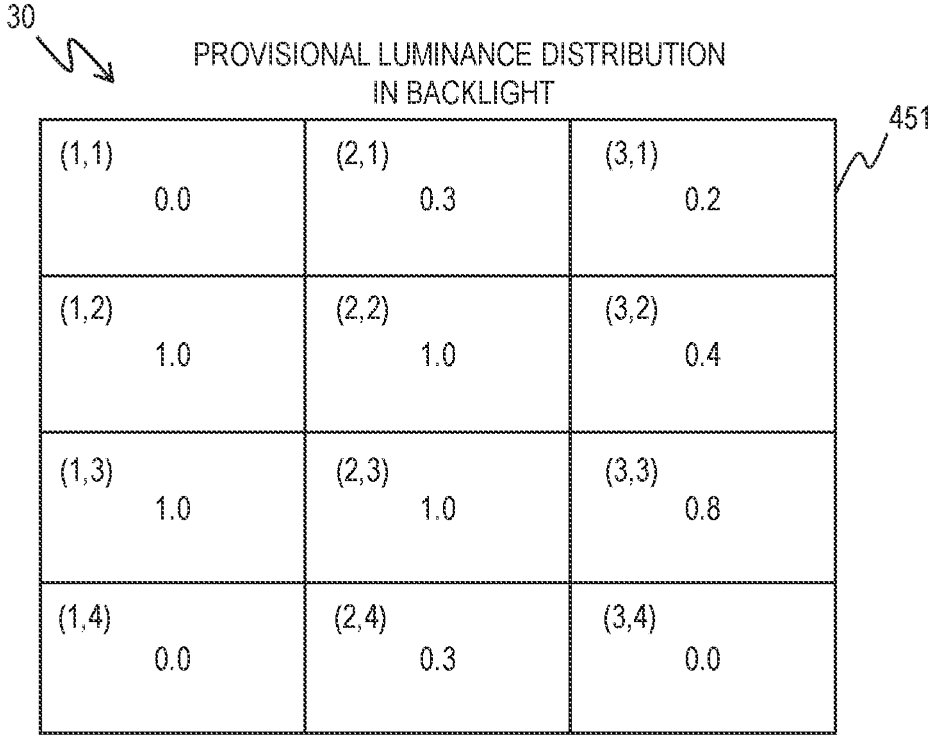
FIG. 6B illustrates a provisional luminance distribution in the backlight corresponding to the display region luminance distribution in the display region in FIG. 6A.

FIG. 6B illustrates a provisional luminance distribution in the backlight 30 corresponding to the display region luminance distribution in the display region 400 in FIG. 6A. The provisional luminance value of each backlight block 451 is the same as the highest luminance value in the display region block 421 opposite thereto. Some of the backlight blocks 451 are assigned a luminance value of 1.0 and the other backlight blocks 451 are assigned luminance values smaller than 1.0.

Figure 7:
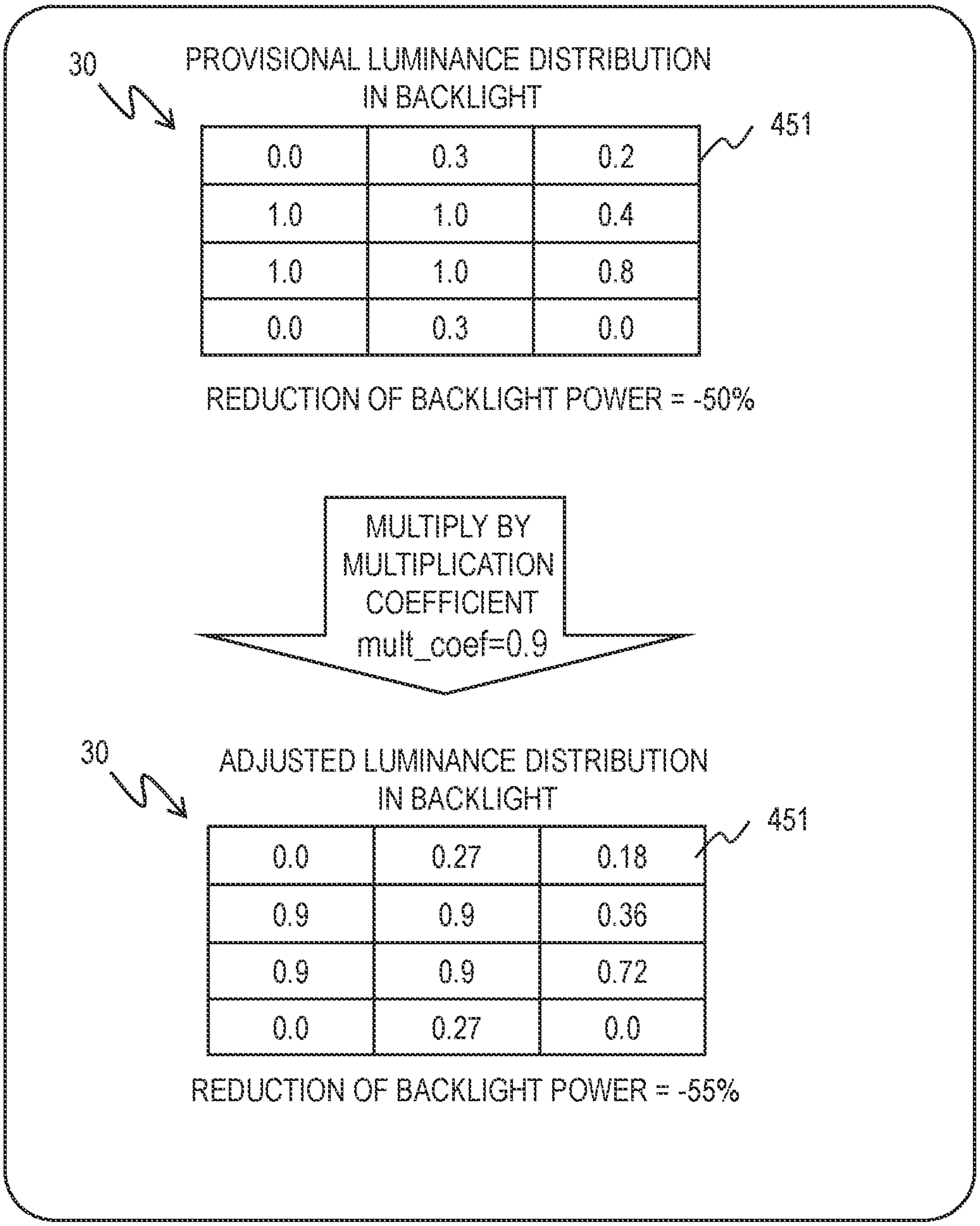
FIG. 7 illustrates an example of adjusting the provisional luminance distribution in the backlight in FIG. 6B.

FIG. 7 illustrates an example of adjusting the provisional luminance distribution in the backlight 30 in FIG. 6B. As to the provisional luminance distribution in the backlight 30, the total sum of the provisional luminance values of all backlight blocks 451 is 6.0. If all backlight blocks 451 are assigned the maximum luminance value of 1.0, the total sum of the luminance values is 12. Accordingly, the power saving effect of the local dimming based on the video frame is −50%.

The backlight luminance controller 210 calculates a multiplication coefficient mult_coef as described above. The multiplication coefficient mult_coef is determined so that the adjustment produces large power saving effect for an image with which the power saving effect of the local dimming to determine provisional luminance values is small.

The area rate Sq in this example is calculated as follows:

$$Sq = \text{SUM}/(\text{MAX} * \text{BL\_number}) = 6.0/(1*12) = 0.5.$$

Further, the multiplication coefficient mult_coef is calculated as follows:

$$\text{mult\_coef} = Sq^{*}B + (1.0 - Sq)^{*}A = 0.5^{*}0.8 + (1.0 - 0.5)^{*}1.0 = 0.9.$$

As noted from the above, the value of the multiplication coefficient mult_coef in this example is 0.9, which is larger than the one in the first example.

The backlight luminance controller 210 calculates products of the provisional luminance values and the calculated multiplication coefficient mult_coef as adjusted luminance values for the individual backlight blocks 451. The power saving effect after the adjustment is −55%.

The power saving effect by local dimming based on the image frame in this example is −50%, which is larger than 0% in the example described with reference to FIG. 5. For this reason, the multiplication coefficient mult_coef is determined so that the power saving effect by the adjustment is smaller than the one in FIG. 5. That is to say, the multiplication coefficient is determined to be 0.9 that is larger than 0.8 in the example of FIG. 5. This example of calculation illustrated in FIGS. 6A, 6B and 7 corresponds to the state 322 where a white window (having an area of 50%) is displayed on a full black background and the point 312 in FIG. 3.

Figure 8A:
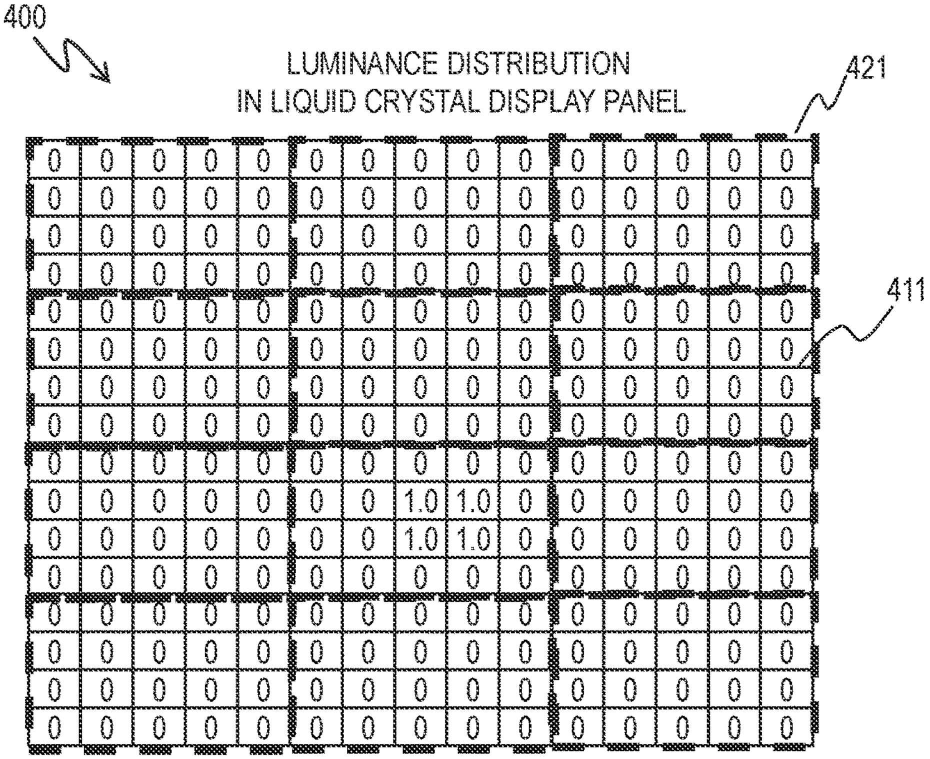
FIG. 8A illustrates still another example of pixel luminance distribution in the display region of a liquid crystal display panel in accordance with an input video frame.

FIG. 8A illustrates still another example of pixel luminance distribution in the display region 400 of a liquid crystal display panel 20 in accordance with an input video frame. Only the display region block 421 at the coordinates (2, 3) includes pixels at a luminance value of 1.0 and all pixels in the other display region blocks 421 are assigned a luminance value of 0.

Figure 8B:
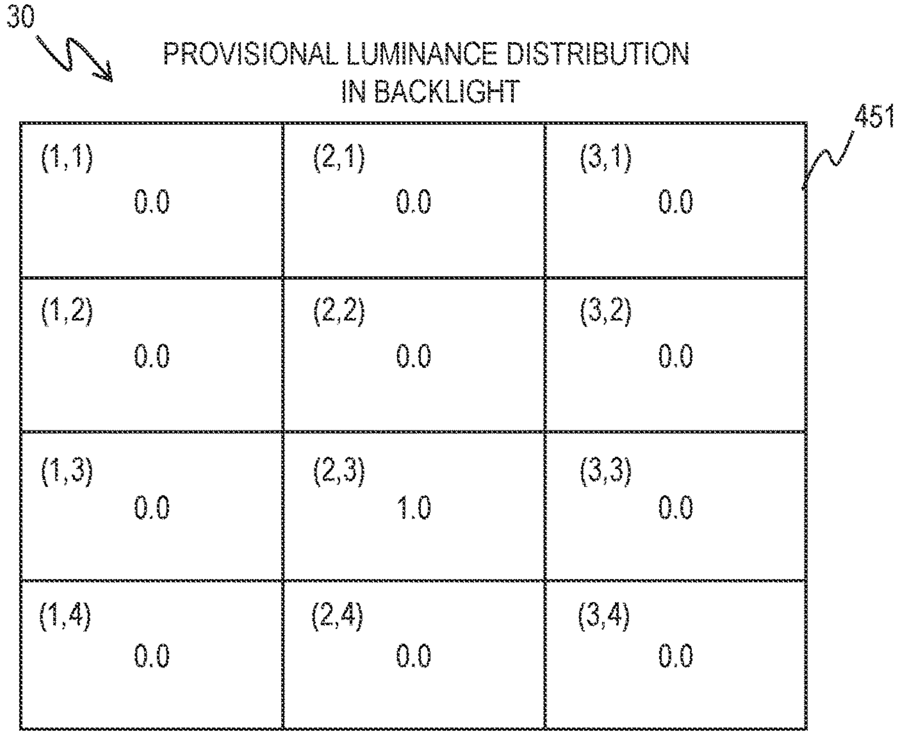
FIG. 8B illustrates a provisional luminance distribution in the backlight corresponding to the display region luminance distribution in the display region in FIG. 8A.

FIG. 8B illustrates a provisional luminance distribution in the backlight 30 corresponding to the display region luminance distribution in the display region 400 in FIG. 8A. The provisional luminance value of each backlight block 451 is the same as the highest luminance value in the display region block 421 opposite thereto. Only the backlight block 451 at the coordinates (2, 3) is assigned a provisional luminance value of 1.0 and the other backlight blocks are assigned a provisional luminance value of 0.

Figure 9:
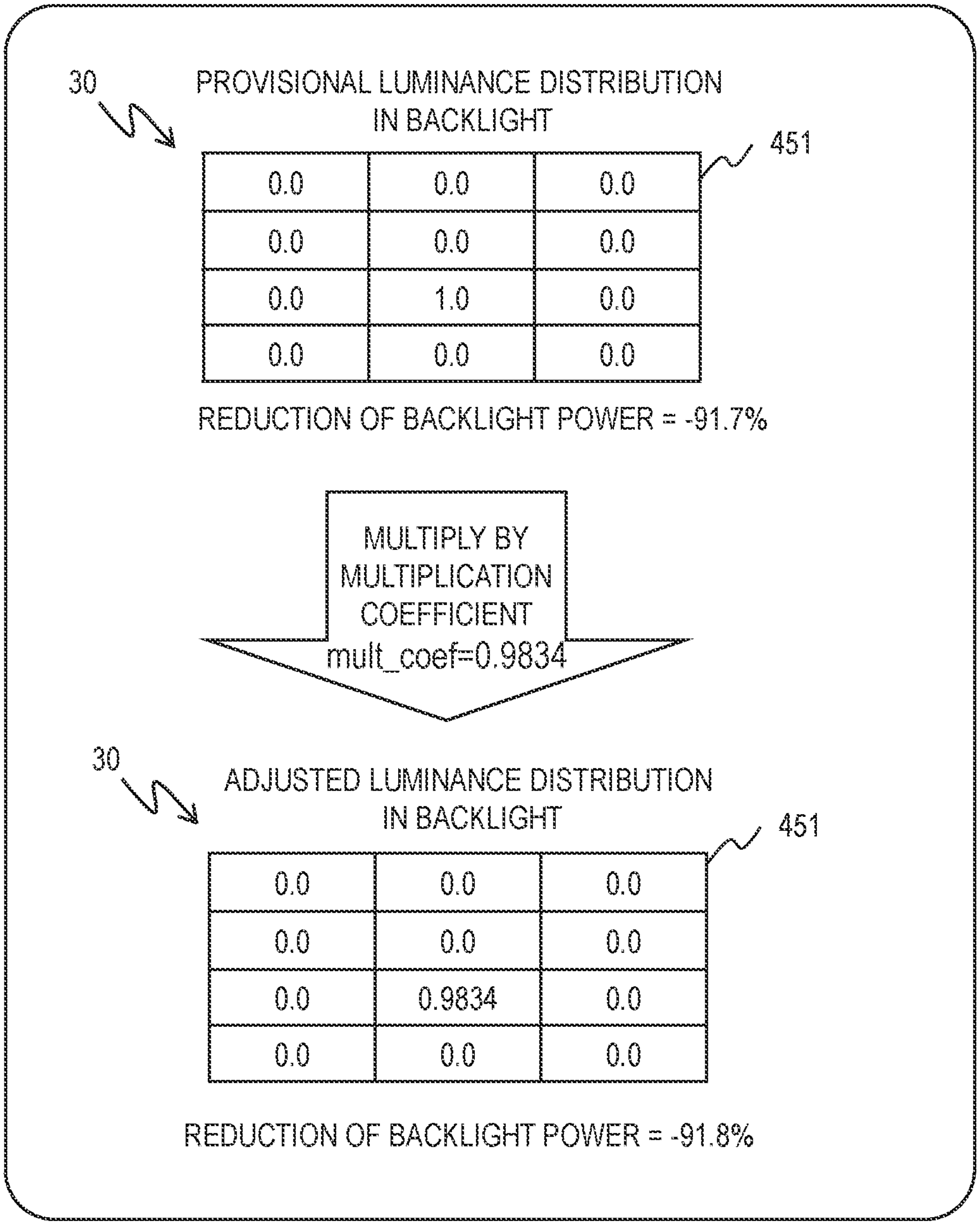
FIG. 9 illustrates an example of adjusting the provisional luminance distribution in the backlight in FIG. 8B.

FIG. 9 illustrates an example of adjusting the provisional luminance distribution in the backlight 30 in FIG. 8B. As to the provisional luminance distribution in the backlight 30, the total sum of the provisional luminance values of all backlight blocks 451 is 1.0. If all backlight blocks 451 are assigned the maximum luminance value of 1.0, the total sum of the luminance values is 12. Accordingly, the power saving effect of the local dimming based on the video frame is −91.7% (−11/12%).

This example of calculation illustrated in FIGS. 8A, 8B and 9 corresponds to a state where a small white window (having an area of 1/12=8.3%) on a full black background in FIG. 3. Since FIGS. 8A, 8B and 9 illustrate an example where the display region 400 and the backlight 30 are divided into 12 display region blocks and 12 backlight blocks, 8.3% is the minimum number attained when only one block is lit. However, if the display region 400 and the backlight 30 are divided into 100 or more blocks, more finer luminance control on each block becomes available. Then, one lit block will correspond to less than 1% like in the state 321 in FIG. 3.

The backlight luminance controller 210 calculates a multiplication coefficient mult_coef as described above. The multiplication coefficient mult_coef is determined so that the adjustment produces large power saving effect for an image with which the power saving effect of the local dimming to determine provisional luminance values is small.

The area rate Sq in this example is calculated as follows:

$$Sq = \text{SUM}/(\text{MAX}^{*}\text{BL\_number}) = 1.0/(1^{*}12) = 0.083.$$

Further, the multiplication coefficient mult_coef is calculated as follows:

$$\begin{aligned}\text{mult\_coef} &= Sq^{*}B + (1.0 - Sq)^{*}A \\ &= 0.083^{*}0.8 + (1.0 - 0.083)^{*}1.0 = 0.9834.\end{aligned}$$

As noted from the above, the value of the multiplication coefficient mult_coef in this example is 0.9834, which is larger than the ones in the foregoing two examples.

The backlight luminance controller 210 calculates products of the provisional luminance values and the calculated multiplication coefficient mult_coef as adjusted luminance values for the individual backlight blocks 451. The power saving effect after the adjustment is −91.8%.

The power saving effect by local dimming based on the image frame in this example is −91.7%, which is larger than 0% and −50% in the examples described with reference to FIGS. 5 and 7. For this reason, the multiplication coefficient mult_coef is determined so that the power saving effect by the adjustment is smaller than the ones in FIGS. 5 and 7. That is to say, the multiplication coefficient is determined to be 0.9834 that is larger than 0.8 and 0.9 in the examples of FIGS. 5 and 7.

As described above, the driving method of this disclosure produces power saving effect on the backlight while the viewer feels minimum oddness on the image quality caused by lowering the luminance, even in the case of an image with which power saving effect on the backlight is difficult to be attained by conventional typical local dimming. In addition, the method of this disclosure is characterized by changing the multiplication coefficient linearly with respect to the number of lit blocks of the backlight. Accordingly, the average rate of change shows continuous and small variation, achieving operation exhibiting minimum oddness on image quality.

From the standpoint to save the power for the backlight, a different approach can be considered that uses the multiplication coefficient at a fixed value of 0.8 (−20% reduction) all the time. In this case, however, the contrast is uniformly degraded among the blocks of the display region. According to this disclosure, the multiplication coefficient is raised when the area displaying white is small; therefore, the local dimming driving works without uniformly degrading the contrast in the whole display region.

Hereinafter, another example of the method of determining provisional luminance values (another example of local dimming) based on a video frame is described. The following example allows adjustment of provisional luminance values using the same technique as described above to reduce the power consumption of the backlight while suppressing the oddness to be felt by the viewer.

Figure 10A:
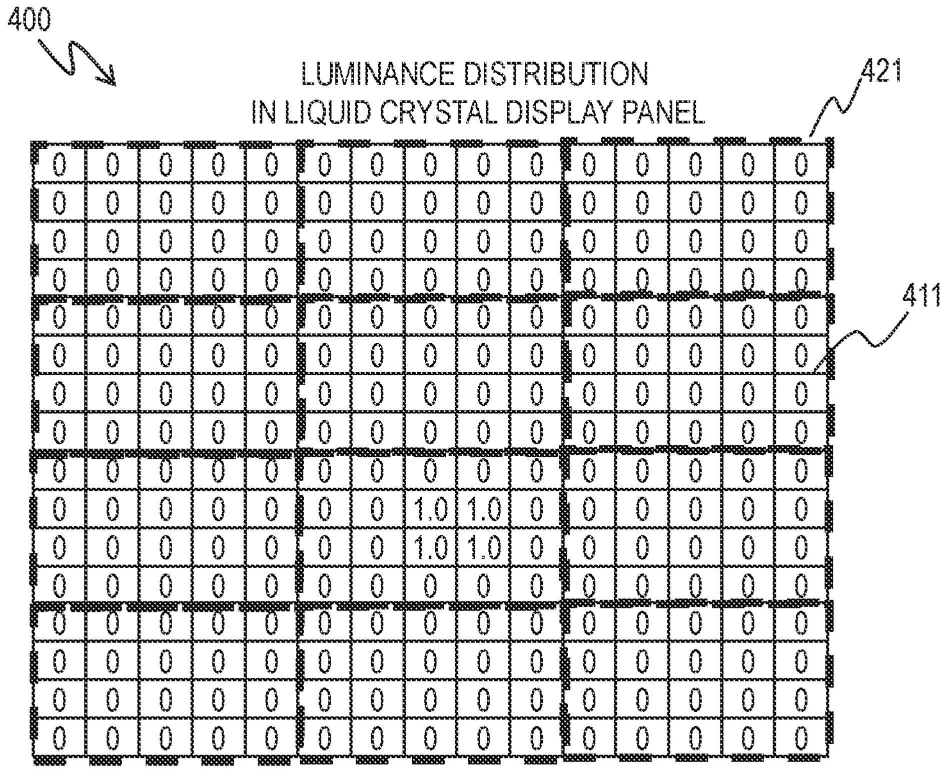
FIG. 10A illustrates still another example of pixel luminance distribution in the display region of a liquid crystal display panel in accordance with an input video frame.

FIG. 10A illustrates another example of pixel luminance distribution in the display region 400 of a liquid crystal display panel 20 in accordance with an input video frame. Only the display region block 421 at the coordinates (2, 3) includes pixels 411 at a luminance value of 1.0 and all pixels 411 in the other display region blocks 421 are assigned at a luminance value of 0.

Figure 10B:
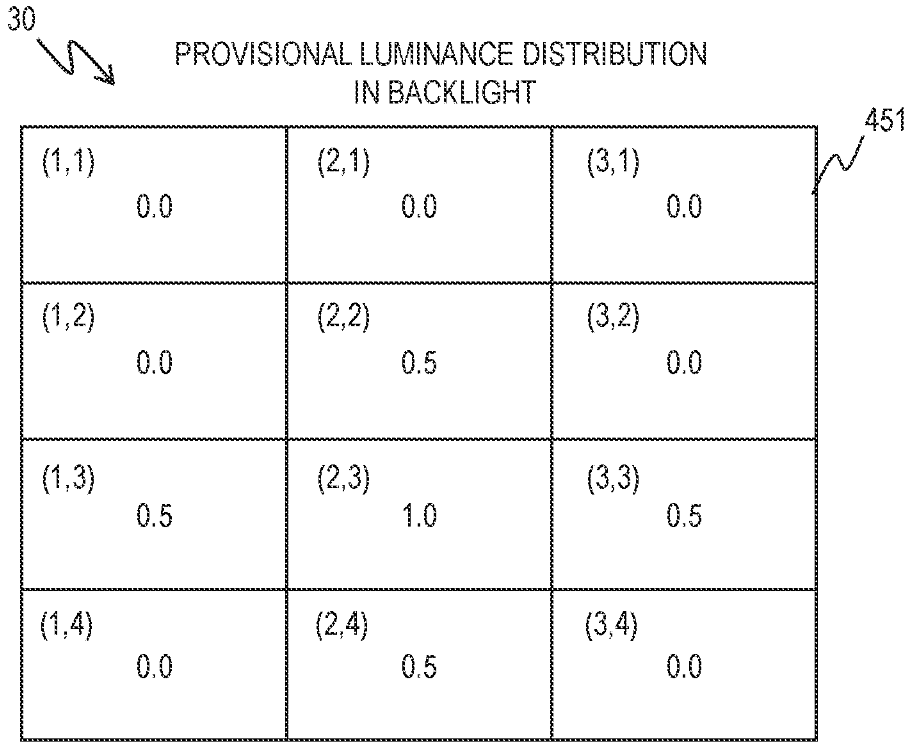
FIG. 10B illustrates a provisional luminance distribution in the backlight corresponding to the display region luminance distribution in the display region in FIG. 10A.

FIG. 10B illustrates a provisional luminance distribution in the backlight 30 corresponding to the display region luminance distribution in the display region 400 in FIG. 10A. The provisional luminance value of each backlight block 451 is determined based on the luminance values in the display region block opposite to the backlight block 451 and the display region blocks adjacent to the opposite display region block along the X-axis or the Y-axis.

In the example of FIG. 10B, the block luminance value calculator 202 assigns a coefficient of 0.5 to the display region blocks that are adjacent to the opposite display region block along the X-axis or the Y-axis. The block luminance value calculator 202 determines that the highest luminance value among the highest luminance value in the opposite display region block and the values obtained by multiplying the highest luminance values in individual adjacent display region blocks by the coefficient of 0.5 is the provisional luminance value for the backlight block 451.

In the example of FIGS. 10A and 10B, only the display region block 421 at (2, 3) includes pixels 411 at a luminance value of 1.0. Accordingly, the provisional luminance value for the backlight block 451 at (2, 3) is 1.0. The provisional luminance values for the backlight blocks 451 adjacent to the opposite backlight block 451 along the X-axis or the Y-axis are 0.5. The provisional luminance values for the other backlight blocks 451 are 0.0.

Figure 11:
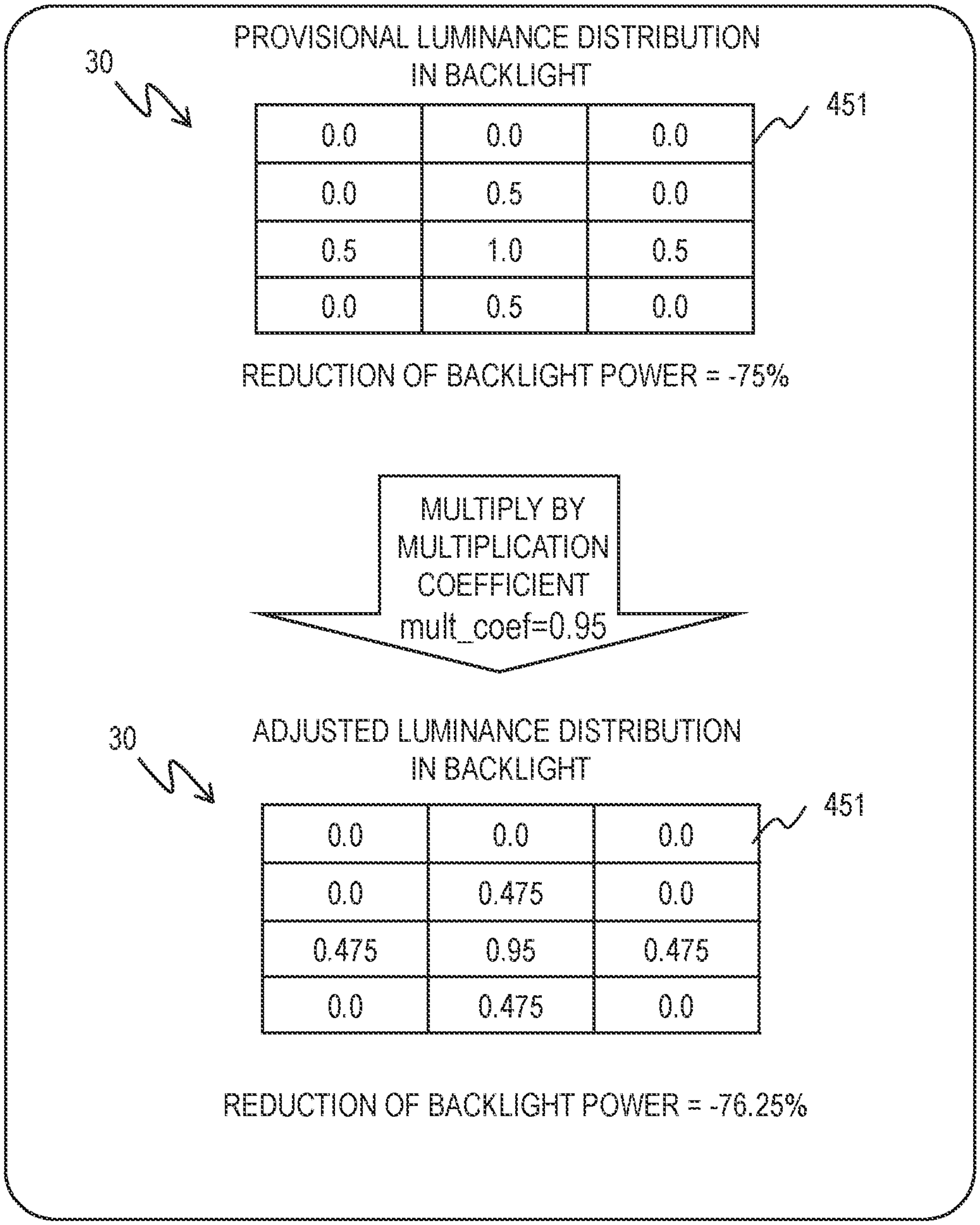
FIG. 11 illustrates an example of adjusting the provisional luminance distribution in the backlight in FIG. 10B.

FIG. 11 illustrates an example of adjusting the provisional luminance distribution in the backlight 30 in FIG. 10B. In the provisional luminance distribution in the backlight 30, the total sum of the provisional luminance values of all backlight blocks 451 is 3.0 If all backlight blocks 451 are assigned the maximum luminance value of 1.0, the total sum of the luminance values is 12. Accordingly, the power saving effect of the local dimming based on the video frame is −75.0% (−9/12%).

The backlight luminance controller 210 calculates a multiplication coefficient mult_coef as described above. The multiplication coefficient mult_coef is determined so that the adjustment produces large power saving effect for an image with which the power saving effect of the local dimming to determine provisional luminance values is small.

The area rate Sq in this example is calculated as follows:

$$Sq=\text{SUM}/(\text{MAX}^*\text{BL\_number})=3.0/(1^*12)=0.25.$$

Further, the multiplication coefficient mult_coef is calculated as follows:

$$\text{mult\_coef}=Sq^*B+(1.0-Sq)^*A=0.25^*0.8+(1.0-0.25)^*1.0=0.95.$$

As noted from the above, the value of the multiplication coefficient mult_coef in this example is 0.95.

The backlight luminance controller 210 calculates products of the provisional luminance values and the calculated multiplication coefficient mult_coef as adjusted luminance values for the individual backlight blocks 451. The power saving effect after the adjustment is −76.25%.

The example described with reference to FIG. 11 results in larger adjustment (a smaller multiplication coefficient or a higher reduction rate) than the adjustment of provisional luminance values for the backlight based on the same video frame. In designing a display device 1, the multiplication coefficient can be too small. In this example, the parameters A and B for determining the amount of adjustment and the function for determining the multiplication coefficient can be determined appropriately depending on the design of the display device 1 and set to the display device 1.

For example, the value of the parameter A representing the maximum value of the multiplication coefficient can be determined to be a value larger than 1 and the upper limit value of the function of the multiplication coefficient can be determined to be 1.0. The function of the multiplication coefficient results in a value 1.0 when the area rate is from 0 to a specific value, and decreases monotonously from the value 1.0 to the minimum value B as the area rate increases from the specific value to 1.0. The reduction rate is 0 when the area rate is from 0 to the specific value and increases linearly from the specific value to the maximum reduction rate as the area rate increases from the specific value to 1.0.

Figure 12:
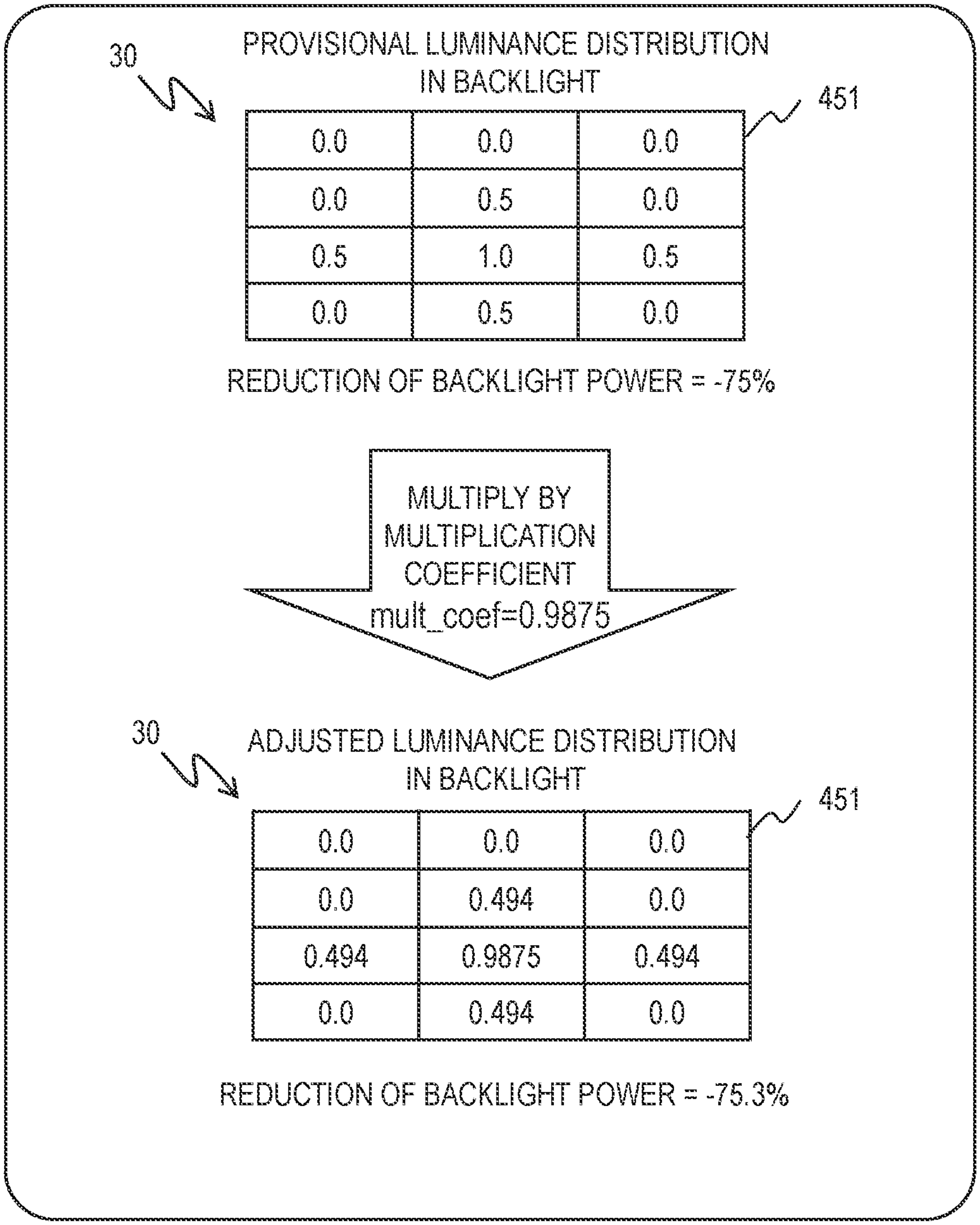
FIG. 12 illustrates adjustment of a provisional luminance distribution in the backlight in the case where a parameter A is set to 1.05 and the upper limit value of the function of the multiplication coefficient is determined to be 1.0.

FIG. 12 illustrates adjustment of a provisional luminance distribution in the backlight 30 in the case where the parameter A is determined to be 1.05 and the function of the multiplication coefficient is defined as described above. The provisional luminance distribution in the backlight 30 is the same as the example of FIG. 11.

The backlight luminance controller 210 calculates a multiplication coefficient mult_coef as described above. The multiplication coefficient mult_coef is determined so that the adjustment produces large power saving effect for an image with which the power saving effect of the local dimming to determine provisional luminance values is small.

The area rate Sq in this example is calculated as follows:

$$Sq=\text{SUM}/(\text{MAX}^*\text{BL\_number})=3.0/(1^*12)=0.25.$$

Further, the multiplication coefficient mult_coef is calculated as follows:

$$\begin{aligned}\text{mult\_coef}&=\min(Sq^*B+(1.0-Sq)^*A,\ 1.0)\\&=\min(0.25^*0.8+(1.0-0.25)^*1.05,\ 1.0)=0.9875.\end{aligned}$$

As noted from the above, the value of the multiplication coefficient mult_coef in this example is 0.9875. This value is larger than the value 0.95 in the example described with reference to FIG. 11 (the reduction rate is smaller).

The backlight luminance controller 210 calculates products of the provisional luminance values and the calculated multiplication coefficient mult_coef as adjusted luminance values for the individual backlight blocks 451. The power saving effect after the adjustment is −75.3%.

Other Embodiments

Figure 13:
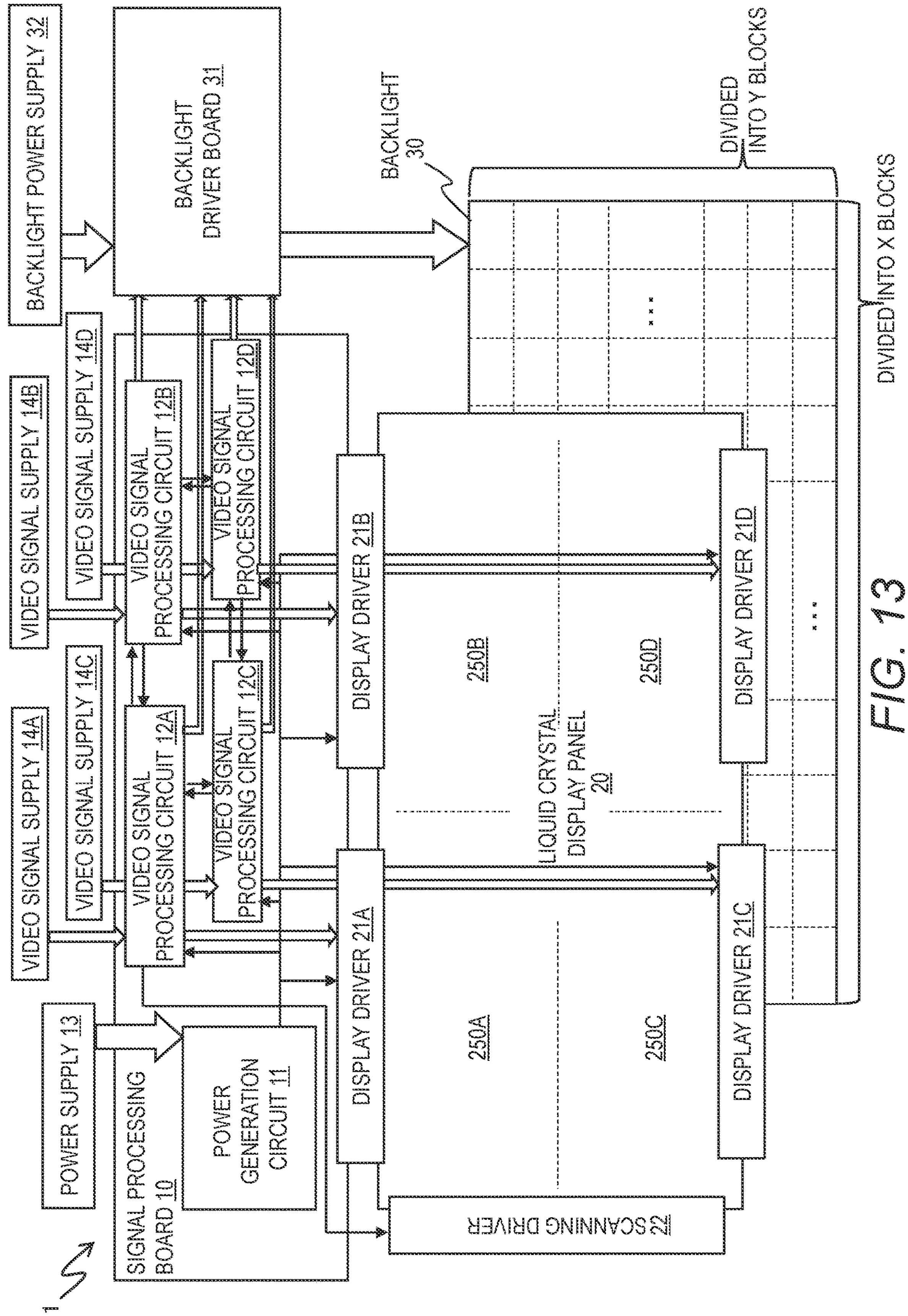
FIG. 13 illustrates a configuration example of a display device in another embodiment.

FIG. 13 illustrates a configuration example of a display device in another embodiment. The following mainly describes differences from the configuration example in FIG. 1. The liquid crystal display device 1 includes video signal supplies 14A to 14D and display drivers 21A to 21D. The signal processing board 10 includes video signal processing circuits 12A to 12D. This configuration can be employed when the display region is divided horizontally and/or vertically to be driven by different ICs because the display region has a resolution too high to be driven by one IC.

In this configuration, if each video signal processing circuit processes video data for only the region assigned thereto and controls driving of the corresponding backlight blocks based on the luminance information only for the assigned region, the luminance of the backlight could be significantly different among the regions assigned to different video signal processing circuits to degrade the display quality.

The video signal processing circuits in this embodiment communicate information on the luminance values of their assigned backlight block groups with one another. Each video signal processing circuit determines luminance values for the assigned backlight blocks based on the luminance values for not only the backlight blocks assigned to itself but also the backlight blocks assigned to the other video signal processing circuits. This configuration reduces the unnatural differences in luminance among the backlight block groups assigned to different video signal processing circuits.

In the configuration example of FIG. 13, the whole display region of the liquid crystal display panel 20 is divided into four segment display regions 250A to 250D. The video signal processing circuits 12A to 12D perform processing involved in displaying an image in the segment display regions 250A to 250D, such as generating a signal for displaying an image and a signal for controlling the backlight 30.

Specifically, the video signal processing circuit 12A controls the backlight blocks opposite to the segment display region 250A to display an image in the segment display region 250A. The video signal processing circuit 12B controls the backlight blocks opposite to the segment display region 250B to display an image in the segment display region 250B. The video signal processing circuit 12C controls the backlight blocks opposite to the segment display region 250C to display an image in the segment display region 250C. The video signal processing circuit 12D controls the backlight blocks opposite to the segment display region 250D to display an image in the segment display region 250D.

The video signal supplies 14A to 14D supply a video signal to the associated video signal processing circuits 12A to 12D. The power generation circuit 11 generates electric power for driving ICs such as the video signal processing circuits 12A to 12D and the display drivers 21A to 21D. The display drivers 21A to 21D generate a data signal from the video signal sent from the associated video signal processing circuits 12A to 12D and supplies the data signal to the liquid crystal display panel 20.

The video signal processing circuit 12A converts the data arrangement of the video signal input from the external to send it to the display driver 21A and generates and sends a timing signal for the display driver 21A and the scanning driver 22 to operate. The video signal processing circuit 12A further generates a driving control signal for controlling the driving of the backlight blocks opposite to the segment display region 250A and sends the driving control signal to the backlight driver board 31.

The video signal processing circuit 12B converts the data arrangement of the video signal input from the external to send it to the display driver 21B and generates and sends a timing signal for the display driver 21B to operate. The video signal processing circuit 12B further generates a driving control signal for controlling the driving of the backlight blocks opposite to the segment display region 250B and sends the driving control signal to the backlight driver board 31.

The video signal processing circuit 12C converts the data arrangement of the video signal input from the external to send it to the display driver 21C and generates and sends a timing signal for the display driver 21C to operate. The video signal processing circuit 12C further generates a driving control signal for controlling the driving of the backlight blocks opposite to the segment display region 250C and sends the driving control signal to the backlight driver board 31.

The video signal processing circuit 12D converts the data arrangement of the video signal input from the external to send it to the display driver 21D and generates and sends a timing signal for the display driver 21D to operate. The video signal processing circuit 12D further generates a driving control signal for controlling the driving of the backlight blocks opposite to the segment display region 250D and sends the driving control signal to the backlight driver board 31.

As described about the video signal processing circuit 12 in the foregoing Embodiment 1, each of the video signal processing circuits 12A to 12D controls the assigned backlight blocks based on the luminance values of the pixels of the assigned segment display region in a video frame to be displayed. Each of the video signal processing circuits 12A to 12D determines provisional luminance values for the assigned backlight blocks, determines the multiplication coefficient, and adjusts the provisional luminance values with the multiplication coefficient to determine the definitive luminance values.

The provisional luminance values and the multiplication coefficient can be determined as described in Embodiment 1. The multiplication coefficient is calculated from the highest value MAX among the provisional luminance values for all blocks and the total sum SUM of the provisional luminance values for all blocks in the backlight 30. Accordingly, each of the video signal processing circuits 12A to 12D acquires information required to obtain those values from one or more of the other video signal processing circuits. This configuration reduces the oddness to be felt by the viewer because of the local dimming in a display device controlled by a plurality of video signal processing circuits.

Although the configuration illustrated of FIG. 13 controls four segment display regions and backlight block groups corresponding thereto with four video signal processing circuits, the number of these are not limited to a specific one. Further, the segment display regions can have a different shape.

Figure 14:
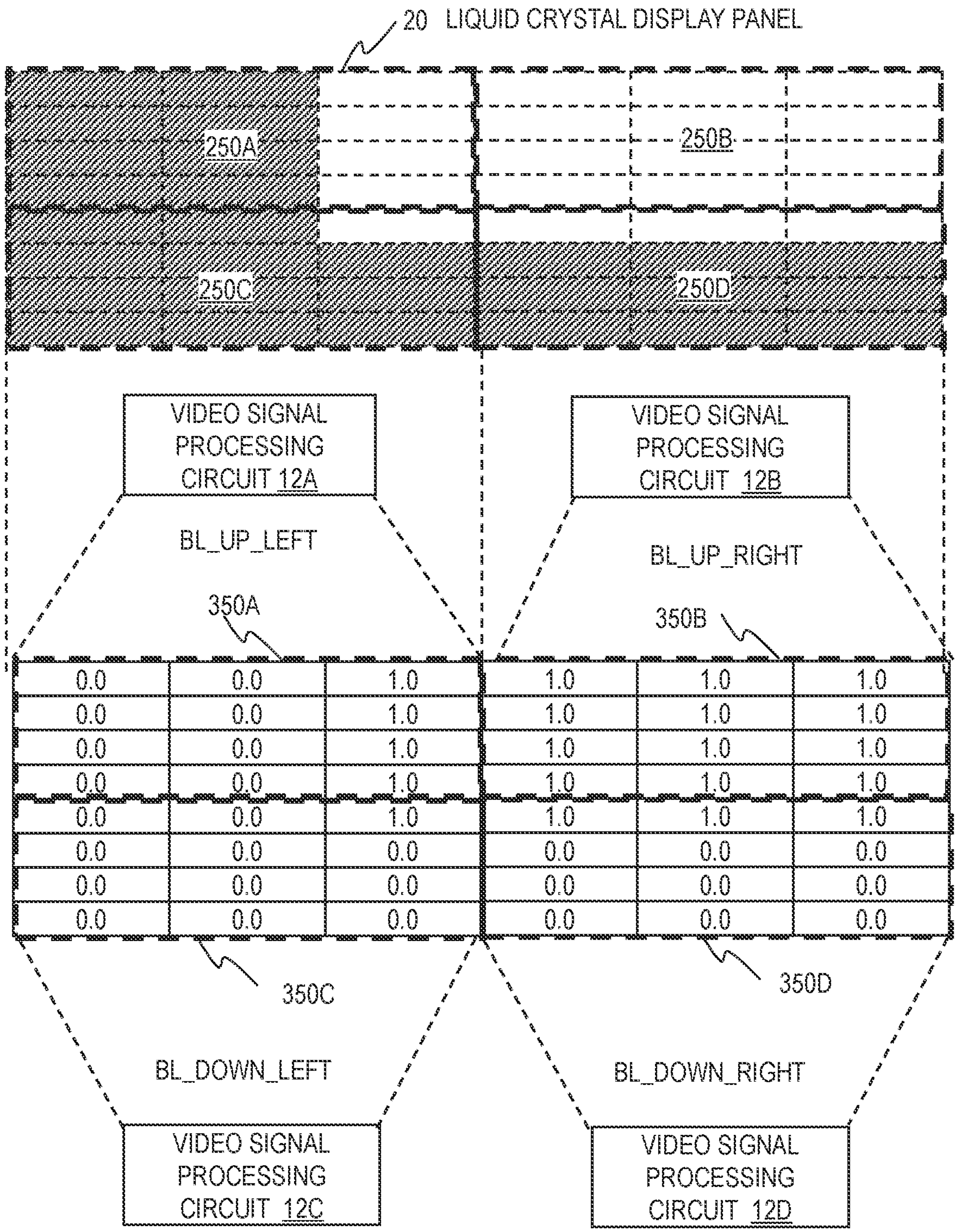
FIG. 14 illustrates an example of an image displayed on a liquid crystal display panel and a distribution of provisional luminance values in the backlight for the image.

FIG. 14 illustrates an example of an image displayed on the liquid crystal display panel 20 and a distribution of provisional luminance values in the backlight 30 for the image. The backlight 30 consists of backlight block groups 350A to 350D and they are opposite to the segment display regions 250A to 250D. Each of the backlight block groups 350A to 350D consists of 4×3, 12 in total, of backlight blocks.

The video signal processing circuit 12A controls the upper left backlight block group 350A. The video signal processing circuit 12B controls the upper right backlight block group 350B. The video signal processing circuit 12C controls the lower left backlight block group 350C. The video signal processing circuit 12D controls the lower right backlight block group 350D.

In the example of FIG. 14, the display panel 20 displays a white region on a black background in its upper right area. The provisional luminance values of the backlight blocks correspond to the displayed image. Specifically, in the upper left backlight block group 350A, the backlight blocks in the rightmost column are assigned a provisional luminance value of 1.0 and the other backlight blocks are assigned a provisional luminance value of 0. In the upper right backlight block group 350B, all backlight blocks are assigned a provisional luminance value of 1.0.

In the lower left backlight block group 350C, one backlight block at the upper right corner is assigned a provisional luminance value of 1.0 and the other backlight blocks are assigned a provisional luminance value of 0. In the lower right backlight block group 350D, the backlight blocks in the uppermost row are assigned a provisional luminance value of 1.0 and the other backlight blocks are assigned a provisional luminance value of 0.

Each video signal processing circuit can determine the provisional luminance values for individual backlight blocks in the assigned backlight block group based on the luminance values of the corresponding segment display region. That is to say, the video signal processing circuit 12A determines provisional luminance values for individual backlight blocks in the backlight block group 350A from the luminance values of the pixels in the segment display region 250A in accordance with a video frame. The method of determining the provisional luminance values is the same as the method in Embodiment 1; for example, the luminance value associated with the highest luminance value among the luminance values of the pixels opposite to a backlight block is the provisional luminance value for the backlight block.

In similar, the video signal processing circuit 12B determines provisional luminance values for individual backlight blocks in the backlight block group 350B from the luminance values of the pixels in the segment display region 250B in accordance with the video frame. The video signal processing circuit 12C determines provisional luminance values for individual backlight blocks in the backlight block group 350C from the luminance values of the pixels in the segment display region 250C in accordance with the video frame. The video signal processing circuit 12D determines provisional luminance values for individual backlight blocks in the backlight block group 350D from the luminance values of the pixels of the segment display region 250D in accordance with the video frame.

Further, each video signal processing circuit calculates the highest value MAX among the provisional luminance values in the assigned backlight block group and the total sum SUM of the provisional luminance values for all blocks in the backlight block group and stores those values to a management table.

In the configuration example of FIG. 14, the video signal processing circuit 12A calculates the highest provisional luminance value MAX and the total sum SUM of the provisional luminance values as follows:

$$MAX = 1.0; \text{ and}$$

$$SUM = (0.0 + 0.0 + 1.0 + 0.0 + 0.0 + 1.0 + 0.0 + 0.0 + 1.0 + 0.0 + 0.0 + 1.0) = 4.0.$$

The video signal processing circuit 12B calculates the highest provisional luminance value MAX and the total sum SUM of the provisional luminance values as follows:

$$MAX = 1.0; \text{ and}$$

$$SUM = \begin{matrix}(1.0 + 1.0 + 1.0 + 1.0 + 1.0 + 1.0 + \\ 1.0 + 1.0 + 1.0 + 1.0 + 1.0 + 1.0)\end{matrix} = 12.0.$$

The video signal processing circuit 12C calculates the highest provisional luminance value MAX and the total sum SUM of the provisional luminance values as follows:

$$MAX = 1.0; \text{ and}$$

$$SUM = \begin{matrix}(0.0 + 0.0 + 1.0 + 0.0 + 0.0 + 0.0 + \\ 0.0 + 0.0 + 0.0 + 0.0 + 0.0 + 0.0)\end{matrix} = 1.0.$$

The video signal processing circuit 12D calculates the highest provisional luminance value MAX and the total sum SUM of provisional luminance values as follows:

$$MAX = 1.0; \text{ and}$$

$$SUM = \begin{matrix}(1.0 + 1.0 + 1.0 + 0.0 + 0.0 + 0.0 + \\ 0.0 + 0.0 + 0.0 + 0.0 + 0.0 + 0.0)\end{matrix} = 3.0.$$

FIGS. 15A to 15D provide configuration examples of luminance management tables 123A to 123D held by the video signal processing circuits 12A to 12D. The luminance management table 123A stores the values of MAX and SUM about the provisional luminance values for the backlight block group 350A calculated by the video signal processing circuit 12A. The other values have not been entered yet. The luminance management table 123B stores the values of MAX and SUM about the provisional luminance values for the backlight block group 350B calculated by the video signal processing circuit 12B. The other values have not been entered yet.

The luminance management table 123C stores the values of MAX and SUM about the provisional luminance values for the backlight block group 350C calculated by the video signal processing circuit 12C. The other values have not been entered yet. The luminance management table 123D stores the values of MAX and SUM about the provisional luminance values for the backlight block group 350D calculated by the video signal processing circuit 12D. The other values have not been entered yet.

Each video signal processing circuit communicates with the other video signal processing circuits to acquire values to fill the remaining fields of its luminance management table and receives necessary information. Hereinafter, an example of communication among video signal processing circuits is described.

The video signal processing circuits 12A and 12C communicate to share their information each other. FIG. 16A illustrates the luminance management tables 123A and 123C updated with the result of communication between the video signal processing circuits 12A and 12C. The video signal processing circuit 12A receives the values of MAX and SUM of the backlight block group 350C from the video signal processing circuit 12C and stores the values to the luminance management table 123A. The video signal processing circuit 12C receives the values of MAX and SUM of the backlight block group 350A from the video signal processing circuit 12A and stores the values to the luminance management table 123C.

FIG. 16B illustrates the luminance management tables 123B and 123D updated with the result of communication between the video signal processing circuits 12B and 12D. The video signal processing circuit 12B receives the values of MAX and SUM of the backlight block group 350D from the video signal processing circuit 12D and stores the values to the luminance management table 123B. The video signal processing circuit 12D receives the values of MAX and SUM of the backlight block group 350B from the video signal processing circuit 12B and stores the values to the luminance management table 123D.

Next, the video signal processing circuits 12A and 12B communicate to share their information each other. FIG. 16C illustrates the luminance management tables 123A and 123B updated with the result of communication between the video signal processing circuits 12A and 12B. The video signal processing circuit 12A receives the values of MAX and SUM of the backlight block groups 350B and 350D from the video signal processing circuit 12B and stores the values to the luminance management table 123A. The video signal processing circuit 12B receives the values of MAX and SUM of the backlight block groups 350A and 350C from the video signal processing circuit 12A and stores the values to the luminance management table 123B.

The video signal processing circuits 12C and 12D communicate to share their information each other. FIG. 16D illustrates the luminance management tables 123C and 123D updated with the result of communication between the video signal processing circuits 12C and 12D. The video signal processing circuit 12C receives the values of MAX and SUM of the backlight block groups 350B and 350D from the video signal processing circuit 12D and stores the values to the luminance management table 123C. The video signal processing circuit 12D receives the values of MAX and SUM of the backlight block groups 350A and 350C from the video signal processing circuit 12C and stores the values to the luminance management table 123D.

Through the foregoing communication among the video signal processing circuits, all necessary information is stored in the luminance management tables of all video signal processing circuits. The above-described communication is an example; the pairs of video signal processing circuits to communicate and the information to be communicated are not limited as far as each video signal processing circuit can acquire necessary information. For example, each video signal processing circuit can communicate with all the other video signal processing circuits to receive necessary information. The information to be communicated is not limited as far as each video signal processing circuit can obtain the multiplication coefficient.

Each video signal processing circuit can acquire the values of MAX and SUM calculated by another video signal processing circuit by receiving them directly from the video signal processing circuit or via still another video signal processing circuit. In the above-described example, the video signal processing circuit 12A acquires the values of MAX and SUM of the backlight block groups 350B and 350C by receiving them from the video signal processing circuits 12B and 12C and acquires the values of MAX and SUM of the backlight block group 350D by receiving them from the video signal processing circuit 12D via the video signal processing circuit 12B.

Each video signal processing circuit calculates the multiplication coefficient mult_coef from the information in its luminance management table to determine the definitive luminance values (adjusted luminance values) for the assigned backlight blocks. The video signal processing circuit calculates the values of MAX and SUM of the whole backlight 30 from the values of MAX and SUM of all backlight block groups 350A to 350D. The multiplication coefficient is calculated from those values in the same way as the foregoing Embodiment 1. The multiplication coefficient is common to all video signal processing circuits 12A to 12D.

An example of the calculation of the multiplication coefficient is described. Each video signal processing circuit calculates the total sum MAXall of all values of MAX in its luminance management table and the total sum SUMall of all values of SUM in its luminance management table. In the example of FIGS. 16A to 16D, the total sum MAXall of the values of MAX is 4.0 and the total sum SUMall of the values of SUM is 20.0. The total number of backlight blocks BL_number in the whole backlight 30 is 48. Assume that the maximum value A for the multiplication coefficient is determined to be 1.0 and the minimum value B for the multiplication coefficient to be 0.8, as described with reference to FIG. 3.

The area rate Sq in this example is calculated as follows:

$$Sq = \text{SUMall}/(\text{MAXall}^*\text{BL\_number}) = 20.0/(1.0^*48) = 0.417.$$

Further, the multiplication coefficient mult_coef is calculated as follows:

$$\text{mult\_coef} = 0.417^*0.8 + (1.0 - 0.417)^*1.0 = 0.917.$$

Figure 17:
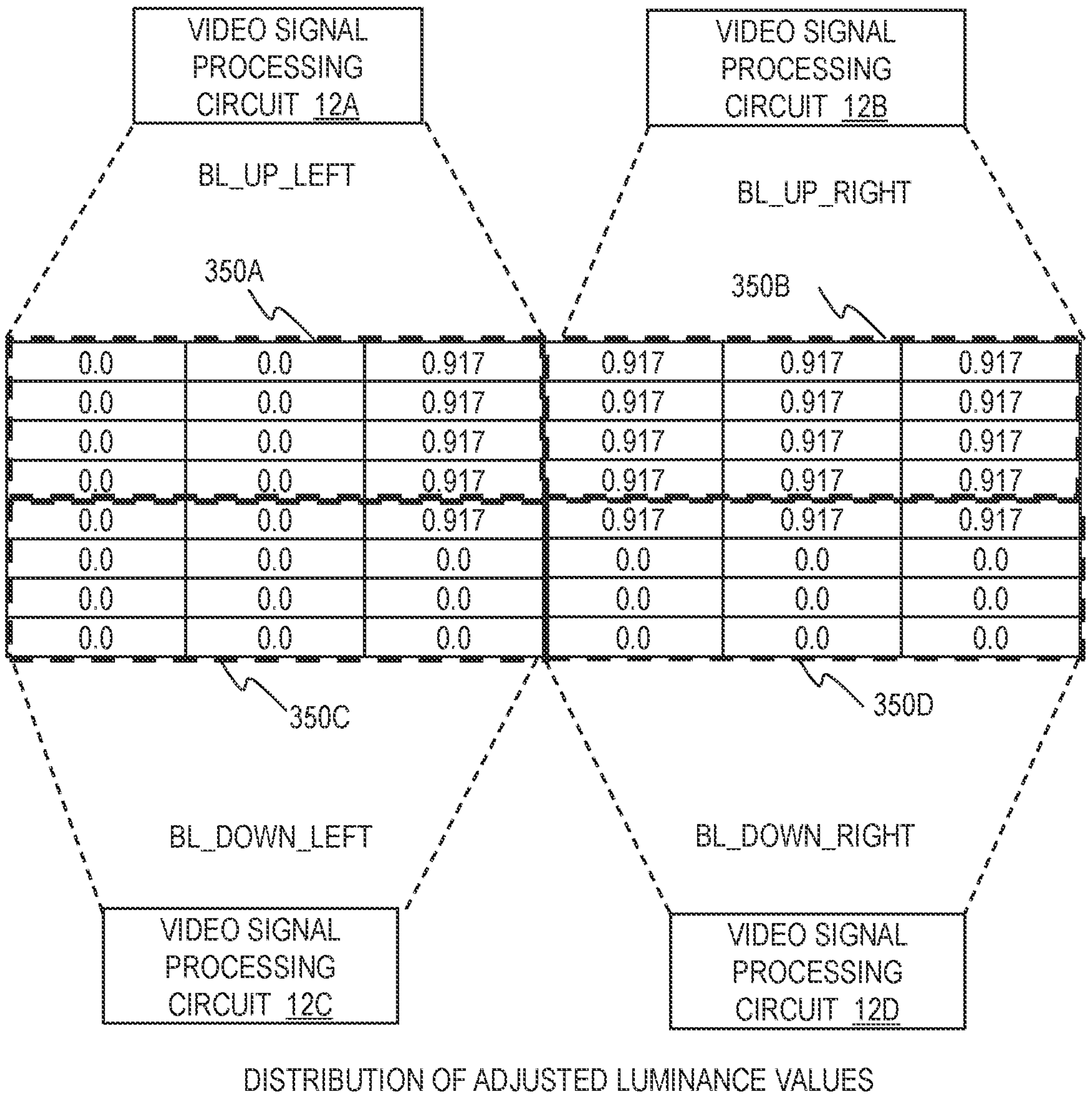
FIG. 17 illustrates a distribution of adjusted luminance values for backlight blocks.

The definitive luminance value of each backlight block is a value obtained by adjusting the provisional luminance value with the multiplication coefficient. FIG. 17 illustrates a distribution of adjusted luminance values for the backlight blocks. In FIG. 17, the luminance values of the backlight blocks across the boundary of a backlight block group are not different because the multiplication coefficient is common. As understood from the above, this embodiment reduces the oddness to be felt by the viewer because of the local dimming in a configuration where a plurality of video signal processing circuits individually control different backlight block groups.

Next, an example where the display region of a liquid crystal display panel 20 is divided into two segment display regions is described. Two video signal supplies, two display drivers, and two video signal processing circuits are provided for the two segment display regions.

Figure 18:
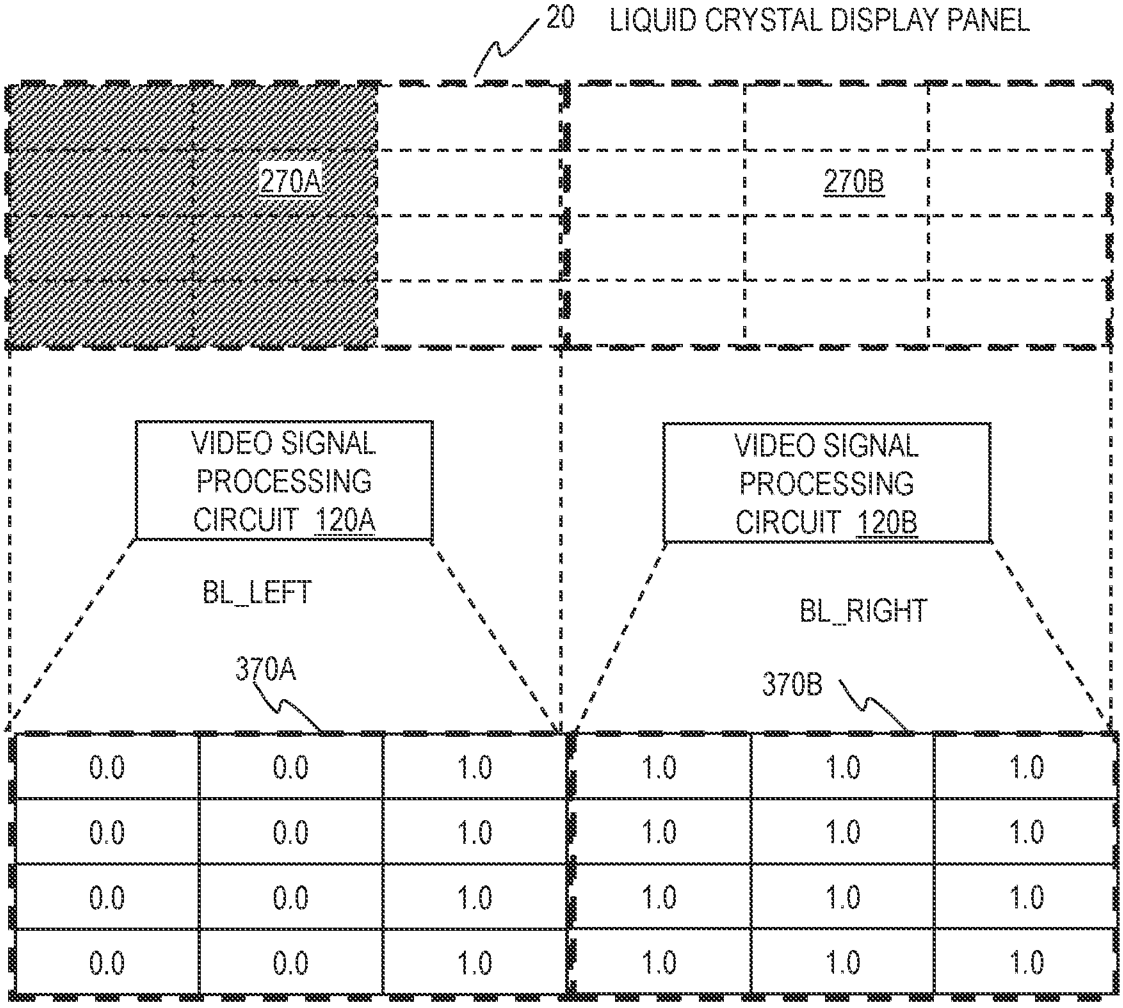
FIG. 18 illustrates an example of an image displayed on a liquid crystal display panel and a distribution of provisional luminance values in the backlight for the image.

FIG. 18 illustrates an example of an image displayed on the liquid crystal display panel 20 and a distribution of provisional luminance values in the backlight 30 for the image. The display region of the liquid crystal display panel 20 is divided into two segment display region 270A and 270B. The backlight 30 consists of backlight block groups 370A and 370B opposite to the segment display regions 270A and 270B. Each of the backlight block groups 370A and 370B consists of 4×3, 12 in total, of backlight blocks.

A video signal processing circuit 120A controls the backlight block group 370A on the left. The video signal processing circuit 120B controls the backlight block group 370B on the right. In the example of FIG. 18, the liquid crystal display panel 20 displays a black region on the left and a white region on the right. The provisional luminance values for the backlight blocks correspond to the displayed image. Specifically, in the backlight block group 370A on the left, the backlight blocks in the rightmost column are assigned a provisional luminance value of 1.0 and the other backlight blocks are assigned a provisional luminance value of 0. In the backlight block group 370B on the right, all backlight blocks are assigned a provisional luminance value of 1.0.

Each video signal processing circuit can determine the provisional luminance values for individual backlight blocks in the assigned backlight block group based on the luminance values of the corresponding segment display region. That is to say, the video signal processing circuit 120A determines provisional luminance values for individual backlight blocks in the backlight block group 370A from the luminance values of the pixels of the segment display region 270A in accordance with the video frame. The method of determining the provisional luminance values is the same as the one in the foregoing examples; for example, the luminance value associated with the highest luminance value among the luminance values of the pixels opposite to a backlight block is the provisional luminance value for the backlight block.

In similar, the video signal processing circuit 120B determines provisional luminance values for individual backlight blocks in the backlight block group 370B from the luminance values of the pixels of the segment display region 270B in accordance with the video frame.

Further, each video signal processing circuit calculates the highest value MAX among the provisional luminance values in the assigned backlight block group and the total sum SUM of the provisional luminance values for all blocks in the backlight block group and stores those values to a management table.

In the configuration example of FIG. 18, the video signal processing circuit 120A calculates the highest provisional luminance value MAX and the total sum SUM of provisional luminance values as follows:

$$MAX = 1.0;\text{ and}$$

$$SUM = (0.0 + 0.0 + 1.0 + 0.0 + 0.0 + 1.0 + 0.0 + 0.0 + 1.0 + 0.0 + 0.0 + 1.0) = 4.0.$$

The video signal processing circuit 120B calculates the highest provisional luminance value MAX and the total sum SUM of provisional luminance values as follows:

$$MAX = 1.0;\text{ and}$$

$$SUM = \begin{matrix}(1.0 + 1.0 + 1.0 + 1.0 + 1.0 + 1.0 + \\ 1.0 + 1.0 + 1.0 + 1.0 + 1.0 + 1.0)\end{matrix} = 12.0.$$

FIGS. 19A and 19B provide configuration examples of luminance management tables 127A and 127B held by the video signal processing circuit 120A and 120B. The luminance management table 127A stores the values of MAX and SUM about the provisional luminance values for the backlight block group 370A calculated by the video signal processing circuit 120A. The other values have not been entered yet. The luminance management table 127B stores the values of MAX and SUM about the provisional luminance values for the backlight block group 370B calculated by the video signal processing circuit 120B. The other values have not been entered yet.

Figures 20, 21:
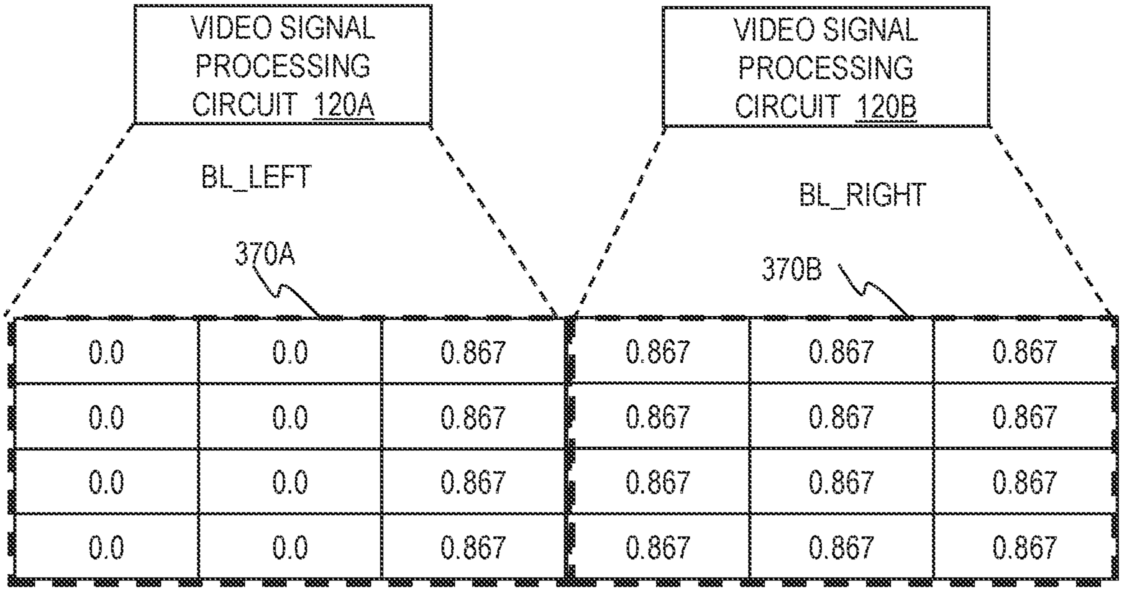
FIG. 20 illustrates luminance management tables updated with a result of communication between video signal processing circuits.
FIG. 21 illustrates a distribution of adjusted luminance values for backlight blocks.

Each video signal processing circuit communicates with the other video signal processing circuit to acquire values to fill the remaining fields of its luminance management table and receives necessary information. FIG. 20 illustrates the luminance management tables 127A and 127B updated with the result of communication between the video signal processing circuits 120A and 120B.

The video signal processing circuit 120A receives the values of MAX and SUM of the backlight block group 370B from the video signal processing circuit 120B and stores the values to the luminance management table 127A. The video signal processing circuit 120B receives the values of MAX and SUM of the backlight block group 370A from the video signal processing circuit 120A and stores the values to the luminance management table 127B. Through the foregoing communication between the video signal processing circuits, all necessary information is stored in the luminance management tables of both of the video signal processing circuits.

The video signal processing circuits 120A and 120B calculate the multiplication coefficient mult_coef from the information in their luminance management tables to determine the definitive luminance values (adjusted luminance values) for the assigned backlight blocks. The video signal processing circuits 120A and 120B calculate the values of MAX and SUM of the whole backlight 30 from the values of MAX and SUM of both of the backlight block groups 370A and 370B. The multiplication coefficient is calculated from those values in the same way as the foregoing Embodiment 1. The multiplication coefficient is common to the video signal processing circuits 120A and 120B.

An example of the calculation of the multiplication coefficient is described. Each video signal processing circuit calculates the total sum MAXall of all values of MAX in its luminance management table and the total sum SUMall of all values of SUM in its luminance management table. In this example, the total sum MAXall of the values of MAX is 2.0 and the total sum SUMall of the values of SUM is 16.0. The total number of backlight blocks BL_number in the whole backlight 30 is 24. Assume that the maximum value A for the multiplication coefficient is determined to be 1.0 and the minimum value B for the multiplication coefficient to be 0.8, as described with reference to FIG. 3.

The area rate Sq in this example is calculated as follows:

$$Sq = \text{SUMall}/(\text{MAXall}^*\text{BL\_number}) = 16.0/(1.0^*24) = 0.667.$$

Further, the multiplication coefficient mult_coef is calculated as follows:

$$\text{mult\_coef} = 0.667^*0.8 + (1.0 - 0.667)^*1.0 = 0.867.$$

The definitive luminance value of each backlight block is a value obtained by adjusting the provisional luminance value with the multiplication coefficient. FIG. 21 illustrates a distribution of adjusted luminance values for the backlight blocks. In FIG. 21, the luminance values of the backlight blocks across the boundary of a backlight block group are not different because the multiplication coefficient is common. As understood from the above, this embodiment reduces the oddness to be felt by the viewer because of the local dimming in a configuration where a plurality of video signal processing circuits individually control different backlight block groups.

Figure 22:
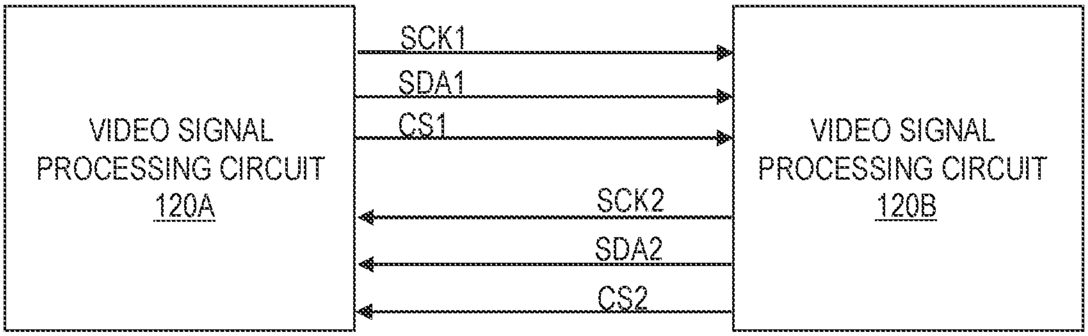
FIG. 22 illustrates examples of data to be communicated between video signal processing circuits.

FIG. 22 illustrates examples of data to be communicated between the video signal processing circuits 120A and 120B. The same explanation is applicable to the communication between video signal processing circuits illustrated in FIG. 13. The video signal processing circuit 120A sends a data signal SDA1 specifying the values of MAX and SUM of the assigned backlight block group to the video signal processing circuit 120B using a clock signal SCK1 and a control signal CS1.

The video signal processing circuit 120B sends a data signal SDA2 specifying the values of MAX and SUM of the assigned backlight block group to the video signal processing circuit 120A using a clock signal SCK2 and a control signal CS2. The signal transmission lines can be reduced by sharing one or more of the signal lines between the video signal processing circuits 120A and 120B.

Figure 23:
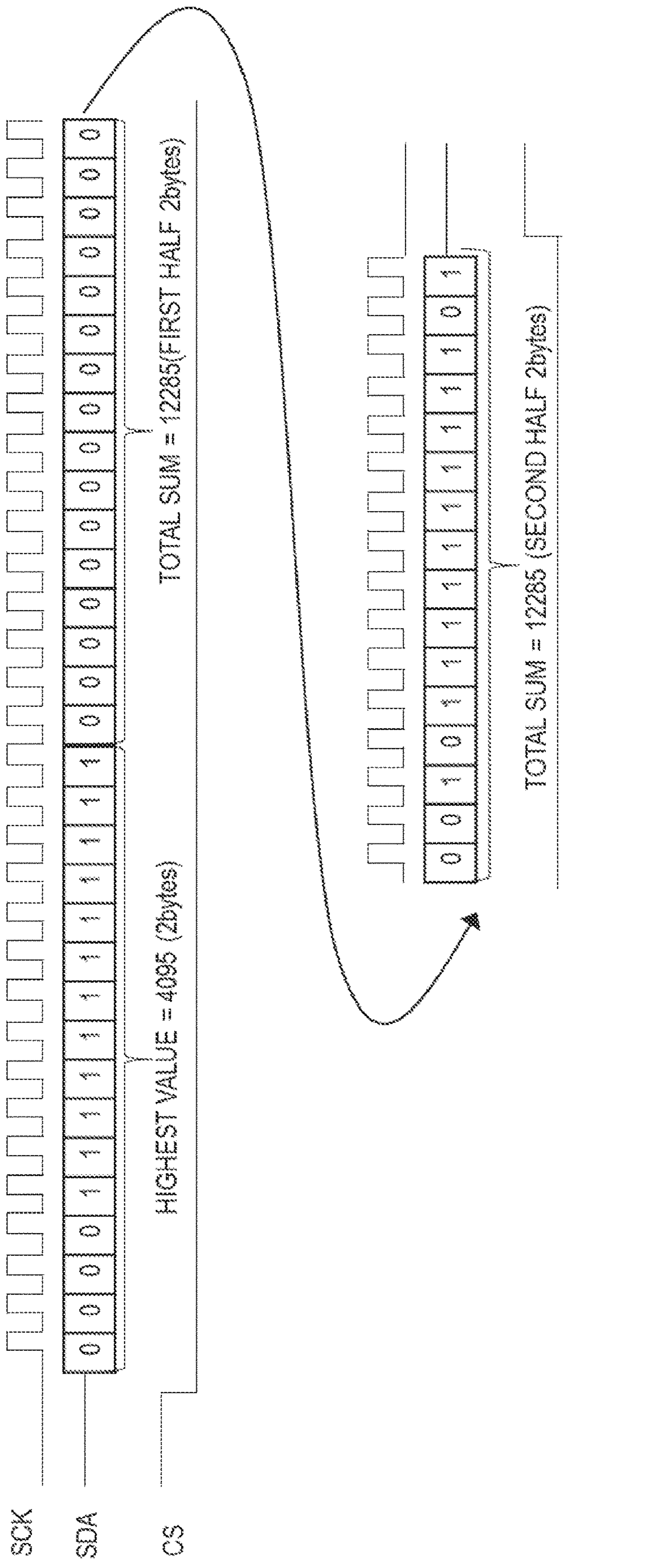
FIG. 23 illustrates examples of waveforms of a clock signal, a data signal, and a control signal.

FIG. 23 illustrates examples of waveforms of the clock signal SCK, the data signal SDA, and the control signal CS. In the example of FIG. 23, the data signal SDA transmits MAX=1.0 and SUM=3.0 of a video signal processing circuit. These values are transmitted in 16 bits. In the case where the MAX is 12-bit resolution and the SUM is 30-bit resolution, MAX=1.0 is expressed as 4095 and SUM=3.0 is expressed as 4095*3=12285. The values of SUM and MAX can be transmitted in the number of bits predetermined in view of the resolution. The resolution for SUM is determined in advance to be the resolution when MAX*BL_number takes the maximum value.

As described above, each video signal processing circuit in this embodiment determines provisional luminance values for the backlight blocks assigned thereto based on the video data for the corresponding region of a video frame. Each video signal processing circuit acquires information on the provisional luminance values of the other video signal processing circuits and determines the multiplication coefficient (reduction rate) for the backlight block group assigned thereto based on the acquired information and the provisional luminance values for the backlight blocks assigned thereto. Each video signal processing circuit adjusts the provisional luminance values for the assigned backlight blocks with the reduction rate.

As set forth above, embodiments of this disclosure have been described; however, this disclosure is not limited to the foregoing embodiments. Those skilled in the art can easily modify, add, or convert each element in the foregoing embodiments within the scope of this disclosure. A part of the configuration of one embodiment can be replaced with a configuration of another embodiment or a configuration of an embodiment can be incorporated into a configuration of another embodiment.

What is claimed is:

1. A method of controlling a backlight of a display device including a display panel and the backlight,
- the backlight includes a plurality of backlight blocks, and the method comprising:
  - determining provisional luminance values for the plurality of backlight blocks and of an input single video frame;
  - determining a luminance reduction rate common to the plurality of backlight blocks based on a value obtained by division with a total sum of the provisional luminance values in a numerator and a product of a highest luminance value among the provisional luminance values and a total number of backlight blocks of the backlight in a denominator; and
  - adjusting the provisional luminance values based on the luminance reduction rate and individual provisional luminance values.

2. The method according to claim 1, wherein a relation between the luminance reduction rate and the total sum of the provisional luminance values is expressed by a function that varies linearly.

3. The method according to claim 1, wherein a maximum luminance reduction rate for the provisional luminance values is not higher than 0.3.

4. The method according to claim 1, wherein the luminance reduction rate is 0 when the value of the ratio is within a range from 0 to a specific value and increases linearly to a maximum luminance reduction rate as the value of the ratio increases from the specific value.

5. The method according to claim 1, wherein adjusting the provisional luminance values adjusts the provisional luminance values in such a manner that a total sum of the amounts of reduction is larger when the total sum of the provisional luminance values is larger.

6. A display device comprising:
- a display panel;
- a backlight disposed behind the display panel, the backlight including a plurality of backlight blocks; and
- a controller configured to control luminance values of the plurality of backlight blocks and transmission of light from the backlight through the display panel,
- wherein the controller is configured to:
  - determine provisional luminance values for the plurality of backlight blocks and of an input single video frame;

determine a luminance reduction rate common to the plurality of backlight blocks based on a value obtained by division with a total sum of the provisional luminance values in a numerator and a product of a highest luminance value among the provisional luminance values and a total number of backlight blocks of the backlight in a denominator; and adjust the provisional luminance values based on the luminance reduction rate and the individual provisional luminance values.

7. The display device according to claim 6, wherein the controller includes a plurality of processing circuits, wherein each of the processing circuits is configured to:

control a segment region assigned from the display panel to the processing circuit and a backlight block group opposite to the segment region assigned to the processing circuit;

determine provisional luminance values for individual backlight blocks in the assigned backlight block group based on video data for a corresponding region of the video frame;

acquire information on the provisional luminance values of the other processing circuits;

determine amounts of reduction for the individual backlight blocks in the assigned backlight block group based on the information on the provisional luminance values of the other processing circuits and the provisional luminance values for individual backlight blocks in the assigned backlight block group; and adjust the provisional luminance values for the individual backlight blocks in the assigned backlight block group by the amounts of reduction.

* * * * *